US012277952B2

(12) United States Patent
De Haan et al.

(10) Patent No.: US 12,277,952 B2
(45) Date of Patent: Apr. 15, 2025

(54) HEARING DEVICE COMPRISING A LOW COMPLEXITY BEAMFORMER

(71) Applicant: Oticon A/S, Smørum (DK)

(72) Inventors: Jan M. De Haan, Smørum (DK); Robert Rehr, Smørum (DK); Sebastien Curdy-Neves, Ballerup (DK); Svend Feldt, Ballerup (DK); Jesper Jensen, Smørum (DK); Michael Syskind Pedersen, Smørum (DK); Michael Noes Gätke, Smørum (DK); Mohammad El-Sayed, Smørum (DK); Stig Petri, Smørum (DK); Karsten Bonke, Ballerup (DK); Gary Jones, Smørum (DK); Poul Hoang, Smørum (DK)

(73) Assignee: OTICON A/S, Smørum (DK)

( * ) Notice: Subject to any disclaimer, the term of this patent is extended or adjusted under 35 U.S.C. 154(b) by 246 days.

(21) Appl. No.: 18/080,942

(22) Filed: Dec. 14, 2022

(65) Prior Publication Data

US 2023/0186934 A1 Jun. 15, 2023

(30) Foreign Application Priority Data

Dec. 15, 2021 (EP) .................................... 21214739

(51) Int. Cl.
*H04B 15/00* (2006.01)
*G10K 11/178* (2006.01)
(Continued)

(52) U.S. Cl.
CPC .... *G10L 21/0216* (2013.01); *G10K 11/17854* (2018.01); *H04R 1/1083* (2013.01);
(Continued)

(58) Field of Classification Search
CPC ...... G10L 21/0216; G10L 2021/02166; G10K 11/17854; H04R 1/1083; H04R 1/406; H04R 3/005; H04R 2460/01
(Continued)

(56) References Cited

U.S. PATENT DOCUMENTS

| | | | | |
|---|---|---|---|---|
| 2007/0053455 | A1 | 3/2007 | Sugiyama | |
| 2020/0344543 | A1* | 10/2020 | Taenzer | H04R 1/406 |

FOREIGN PATENT DOCUMENTS

| | | | | |
|---|---|---|---|---|
| CN | 103227623 | A * | 7/2013 | |
| EP | 3 236 672 | A1 | 10/2017 | |
| EP | 3876557 | B1 * | 1/2024 | H04R 25/407 |

OTHER PUBLICATIONS

Hashemgeloogerdi Sahar et al. "Joint Beamforming and Reverberation Cancellation Using a Constrained Kalman Filter With Multichannel Linear Prediction", ICASSP 2020—2020 IEEE International Conference on Acoustics, Speech and Signal Processing (ICASSP), IEEE, May 4, 2020, pp. 481-485, XP033793435, (Year: 2020).*

(Continued)

*Primary Examiner* — Ammar T Hamid
(74) *Attorney, Agent, or Firm* — Birch, Stewart, Kolasch & Birch, LLP

(57) ABSTRACT

A hearing device includes a) a multitude of input transducers providing a corresponding multitude of electric input signals; and b) a processor for providing a processed signal in dependence of the electric input signals. The processor includes b1) a beamformer for providing a spatially filtered signal in dependence of electric input signals and beamformer filter coefficients determined in dependence of a fixed steering vector including as elements respective acoustic transfer functions from a target signal source, to each of said multitude of input transducers; and b2) a target adaptation module connected to the input transducers and to at (Continued)

least one beamformer, the target adaptation module being configured to provide compensation signals to compensate the electric input signals so that they match the fixed steering vector.

19 Claims, 11 Drawing Sheets

(51) Int. Cl.

| | |
|---|---|
| ***G10L 21/0216*** | (2013.01) |
| ***H04R 1/10*** | (2006.01) |
| ***H04R 1/40*** | (2006.01) |
| ***H04R 3/00*** | (2006.01) |

(52) U.S. Cl.
CPC ............ *H04R 1/406* (2013.01); *H04R 3/005* (2013.01); *G10L 2021/02166* (2013.01); *H04R 2460/01* (2013.01)

(58) Field of Classification Search
USPC ..................................... 381/84.1, 94.1, 94.3
See application file for complete search history.

(56) References Cited

OTHER PUBLICATIONS

Is Hashemgeloogerdi Sahar et al: "Joint Beamforming and Reverberation Cancellation Using a Constrained Kalman Filter With Multichannel Linear Prediction", ICASSP 2020—2020 IEEE International Conference on Acoustics, Speech and Signal Processing (ICASSP), IEEE (Year: 2020).*
European Search Report, issued in EP Application No. 21214739.1, dated May 31, 2022.
Hashemgeloogerdi et al., "Joint Beamforming and Reverberation Cancellation Using a Constrained Kalman Filter With Multichannel Linear Prediction", ICASSP 2020, IEEE, May 4, 2020, pp. 481-485.

* cited by examiner

HEARING DEVICE COMPRISING A LOW COMPLEXITY BEAMFORMER

TECHNICAL FIELD

The present disclosure relates to hearing devices, e.g. hearing assistive devices, such as headsets or hearing aids.

In hearing assistive devices, it is desirable to capture and enhance speech for different applications. In a hearing aid application, it is desired to enhance external speech sources to improve intelligibility. Another important application is the enhancement of the user's own voice, for hands-free voice communication in headsets (and hearing aids; a hearing aid may also act as a headset), or for a voice interface to the hearing aid. Furthermore, the presence of the user's own voice in the sound scene can be detected to control different features in hearing assistive devices.

An efficient way of enhancing speech is to use multichannel noise reduction techniques such as beamforming. The purpose of the beamforming system is two-fold: pass the speech signal without distortion, while suppressing the less important background noise to a certain level.

In own voice enhancement in headsets, the goal is to remove as much as possible of the undesired background noise. This contrasts with our typical approach to noise reduction in hearing aids, where the goal is mainly to improve intelligibility without sacrificing audibility, i.e., the background noise should not be removed totally. For enhancement of own voice in hearing aids, however, the aims more closely resemble headset applications, i.e., the goal is once again to remove as much as possible of the (otherwise) desired background noise.

SUMMARY

A time-invariant beamformer may be a good baseline for a noise reduction system, if it is possible to make reasonable prior assumptions about the target and the background noise. In a hearing aid system, it may be a fair assumption that the target is impinging from the front.

In the case of an own voice enhancement situation, the user's own voice is approximately originating from the same location across users (i.e., the user's mouth), a calibrated beamformer would be a good baseline for such a noise reduction system.

Acoustical differences across users and/or variations between microphone sensitivity across devices may reduce the performance of such a time-invariant beamformer. Also, since a time-invariant beamformer needs to be designed under the assumption that the noise may originate from any direction, a better beamformer may exist taking knowledge of the specific noise field into account.

Noise reduction solutions in small hearing assistive devices should preferably be executed with few operations and with low complexity and low memory consumption, without sacrificing significantly on noise reduction performance.

The proposed solution comprises a multi-microphone enhancement system (beamformer) operating in the time-frequency domain. The solution to the beamforming problem is subdivided into three parts:

1) A robust time-invariant beamformer part;

2) A noise field adaptation part; and

3) A target steering adaptation part.

A first hearing device:

In an aspect of the present application, a hearing device configured to be worn by a user is provided. The hearing device comprises

- a multitude of input transducers, each providing an electric input signal representing sound in the environment of the hearing device, thereby providing a corresponding multitude of electric input signals;
- a processor for providing a processed signal in dependence of said multitude of electric input signals, the processor comprising
- at least one beamformer for providing a spatially filtered signal in dependence of said electric input signals, or signals originating therefrom, and beamformer filter coefficients, said beamformer filter coefficients being determined in dependence of a fixed steering vector comprising as elements respective acoustic transfer functions from a target signal source providing a target signal to each of said multitude of input transducers, or acoustic transfer functions from a reference input transducer among said multitude of input transducers to each of the remaining input transducers.

The hearing device may further comprise a target adaptation module connected to said multitude of input transducers and to said at least one beamformer, said target adaptation module being configured to provide compensation signals to compensate said multitude of electric input signals so that they match said fixed steering vector.

Thereby an improved hearing device may be provided.

A second hearing device:

In a second aspect, a hearing device, e.g. a hearing aid or a headset, configured to be worn by a user is provided by the present disclosure. The hearing device comprises

- a multitude of input transducers, each providing an electric input signal representing sound in the environment of the hearing device, thereby providing a corresponding multitude of electric input signals;
- a processor for providing a processed signal in dependence of said multitude of electric input signals, the processor comprising
  - a noise reduction system comprising
    - a target-maintaining beamformer having a maximum sensitivity in a direction of a target signal source in said environment and providing a target signal estimate wherein the target signal is maintained; and
    - a target cancelling beamformer having a minimum sensitivity in a direction of said target signal source and providing a noise estimate wherein the target signal is attenuated;
    - a noise canceller comprising an adaptive filter for estimating an adaptive noise reduction parameter (or matrix) and providing noise reduced target signal, wherein an adaptive algorithm of the adaptive filter comprises a complex sign Least Mean Squares (LMS) algorithm, and wherein the adaptive algorithm is configured to determine the sign of a step size parameter of the adaptive algorithm in dependence of an output of the target-cancelling beamformer and the noise reduced target signal.

The target-maintaining beamformer may be time invariant (or adaptive). The target cancelling beamformer may be time invariant (or adaptive). The target-maintaining beamformer and the target cancelling beamformer may be determined in dependence of a fixed steering vector.

Each beamformer may be configured to provide a spatially filtered signal in dependence of said electric input signals, or signals originating therefrom, and fixed or adaptively determined beamformer filter coefficients. The beamformer filter coefficients may be determined in dependence of a steering vector comprising as elements respective a) acoustic transfer functions from a target signal source in said environment providing a target signal to each of said multitude of input transducers, or b) acoustic transfer functions from a reference input transducer among said multitude of input transducers to each of the remaining input transducers.

The adaptive noise reduction parameter (β or matrix β) may be applied to the spatially filtered signal from the target-cancelling beamformer (e.g. in a combination unit). The output (noise estimate) of the target-cancelling beamformer may thereby be filtered, e.g. by multiplying the (typically frequency dependent) adaptive parameter (β), onto the (typically frequency dependent) output of the target-cancelling beamformer, thereby providing an improved estimate of the noise component in the output (target signal estimate) of the target-maintaining beamformer. The improved noise estimate may subsequently be subtracted from the output of the target-maintaining beamformer (target signal estimate) (cf. e.g. FIG. 2, 3), thereby providing a noise reduced target signal.

An Own Voice-Only Detector, or a Hearing Device Comprising an Own Voice-Only Detector:

In an aspect of the present disclosure an own voice-only detector is provided.

The own voice-only detector may e.g. be integrated with a hearing device comprising a target adaptation module according to the present disclosure, the target adaptation module being connected to a multitude of input transducers and to at least one beamformer, and wherein the target adaptation module is configured to provide compensation signal(s) to compensate the multitude of electric input signals so that they match a fixed steering vector of the at least one beamformer.

The own voice-only detector may e.g. be combined or integrated with the first or second hearing devices (e.g. hearing aids or headset or ear-phones) as described above, in the 'detailed description of embodiments' or in the claims.

The at least one beamformer may comprise an own voice beamformer.

The target adaptation module comprises the own voice-only detector

The target adaptation module may comprise at least one adaptive filter for estimating the compensation signal(s).

The at least one adaptive filter may be configured to adaptively determine at least one correction factor to be applied to the electric input signals to provide the compensation signal(s). The at least one adaptive filter of the target adaptation module may comprise an adaptive algorithm. The adaptive algorithm may be or comprise a complex sign Least Mean Squares (LMS) algorithm.

The adaptive filter may be configured to provide the at least one correction factor to the own voice-only detector.

The own voice-only detector may be configured to provide an own voice-only control signal indicative of whether or not, or with what probability, a user's own voice is currently the only voice present in the electric input signal(s) of the hearing device.

The own voice-only detector may be configured to operate in the time-frequency domain (to provide a time variant indication of whether or not, or with what probability, a given frequency band (at a given time), i.e. a given time-frequency unit, comprise only the user's voice (i.e. NOT a) other voices, or b) other voices mixed with the user's voice, or c) noise only).

The own voice-only detector may be configured to provide an own voice-only control signal in the time-domain indicative of whether or not the user's own voice is currently the only voice present in the electric input signal(s) of the hearing device. The own voice-only control signal may be qualified by combination with a (general, e.g. modulation based) voice activity detector, e.g. by logic combination.

The hearing device, e.g. the target adaptation module, may be configured to determine when the at least one correction factor is updated in dependence on the own voice-only control signal.

The own voice-only detector may be configured to compare a current correction factor with a (frequency dependent) average correction factor. The average correction factor may be an internal parameter of the own voice-only detector, e.g. determined as an average of values measured on a multitude of different test persons. The average correction factor may e.g. represent an average value of the correction factor determined by the adaptive filter of the target adaptation module. The average correction factor may e.g. be generated by filtering the correction factor determined by the adaptive filter of the target adaptation module (e.g. by smoothing and/or low-pass filtering).

Based on the comparison of the current correction factor with the (frequency dependent) average correction factor, a distance measure z(k) may be provided. The distance measure is a measure of how far the current (frequency dependent) values of the correction factor are from the average values.

The distance measure may e.g. be modified by a weighting factor in dependence of a current acoustic environment. A current acoustic environment may be more or less probable in combination with an own voice-only situation. A noisy cocktail-party situation may e.g.

negatively influence the probability of own voice-only.

An exemplary own voice-only detector according to the present disclosure is described in the following with reference to FIGS. 8 and 9.

It is intended that some or all of the structural features of the first and second hearing devices described above, in the 'detailed description of embodiments' or in the claims can be combined with embodiments of the own voice-only detector.

The following features may be combined with a hearing device according to the first or second aspects, or where appropriate with the own voice-only detector.

Features Related to the $1^{st}$ and $2^{nd}$ Hearing Aids (and/or to the Own-Voice-Only Detector).

The error signal e is a measure of how well a given compensated input signal match the fixed steering vector. Matching the fixed steering vector may e.g. comprise matching the complex-valued steering vector, e.g. matching the real and imaginary part separately. Alternatively, we may solely match the magnitude (or magnitude squared) or the phase of the steering vector (or both).

The matching may e.g. be achieved by minimizing an error (e.g. difference between) a given current electric input signal (from a given (non-reference) microphone and the electric input signal from the reference microphone as modified by the steering vector of the (fixed) beamformer (cf. e.g. FIG. 3 (general case) or 4A (two-microphone case)). Thereby the multitude of electric input signals may be compensated so that they match the fixed steering vector. The matching may e.g. be provided by the processor, e.g. by the at least one beamformer.

The processor (e.g. an adaptive filter, e.g. and adaptive filter of the target adaptation module) may be configured to minimize an error between a given current electric input signal from a given non-reference input transducer and the electric, reference, input signal from the reference input transducer as modified by the steering vector of the at least one beamformer, to thereby compensate the multitude of electric input signals so that they match the fixed steering vector.

The solution according to the present disclosure is related to look vector estimation for beamforming, but instead of computing a new beamformer based on an estimated steering vector, it is proposed that the inputs to an existing beamformer are compensated to match the look vector of the existing beamformer.

The processor may comprise a noise reduction system (e.g. a noise canceller). The noise reduction system may comprise the beamformer. The beamformer according to the present disclosure may form part of the noise reduction system. The beamformer according to the present disclosure may, however, alternatively, or additionally, be used for other tasks, e.g. in connection with other algorithms, such as echo cancellation, own voice detection, etc.

The target adaptation module may comprise an (e.g. at least one) adaptive filter for estimating the compensation signal.

The at least one adaptive filter (of the target adaptation module) may be configured to adaptively determine at least one correction factor to be applied to the electric input signals.

The hearing device (e.g. the target adaptation module) may comprise a voice activity detector for estimating whether or not or with what probability an input signal comprises a voice signal at a given point in time, and wherein the at least one adaptive filter is controlled by the voice activity detector.

The least one beamformer may comprise an own voice beamformer, and the target adaptation module may comprise an own voice-only detector configured to determine when the at least one correction factor is updated.

The adaptive filter may comprise an adaptive algorithm and a variable filter, wherein the adaptive algorithm comprises a step size parameter, and wherein the adaptive algorithm is configured to determine a sign of the step size parameter.

The adaptive algorithm may be a complex sign Least Mean Squares (LMS) algorithm. The adaptive algorithm may be configured to determine the sign of the step size parameter in dependence of 'the electric input signal' and the error signal. In a multi microphone system (e.g. M≥2 or M≥3) principle (cf. e.g. FIG. 7), we just need to minimize the transfer functions between the different microphones, with respect to a reference microphone. In case of M=3 microphones, the steering vector may be written as $d=[1, d_2, d_3]$. One option is to separately have two parallel systems similar to the system shown in FIG. 4A or 4B, as indicated in FIG. 7.

One of the input transducers may be defined as a reference input transducer. The (typically frequency dependent) acoustic transfer functions ATF may comprise absolute (AATF) or relative acoustic transfer functions (RATF). To determine the relative acoustic transfer functions (RATF), e.g. RATF-vectors ($d_\theta$) from the corresponding absolute acoustic transfer functions ($H_\theta$) for a given location (θ) of the target sound source, the element $d_m$ of the RATF-vector ($d_\theta$) for the $m^{th}$ input transducer (e.g. a microphone) and direction (θ) is $d_m(k, \theta)=H_m(\theta, k)/H_i(\theta, k)$, where $H_i(\theta, k)$ is the (absolute) acoustic transfer function from the given location (θ) to a reference input transducer (e.g. a reference microphone) (m=i) among the M input transducers (e.g. microphones) of the hearing device. Such absolute and, 4A relative transfer functions (for a given artificial or natural person) can be estimated (e.g. in advance of the use of the hearing device) and stored in a database (e.g. in memory of the hearing device). The resulting (absolute) acoustic transfer function (AATF) vector $H_\theta$ for sound from a given location (θ) may be written as $$H(\theta, k)=[H_1(\theta, k) \ldots H_M(\theta, k)]^T,\ k=1, \ldots, K$$

and the relative acoustic transfer function (RATF) vector $d_\theta$ from this location be written as $$d(\theta,k)=[d_1(\theta,k) \ldots d_M(\theta,k)]^T,\ k=1, \ldots, K$$

where M is the number of input transducers (e.g. microphones).

The processor may be configured to apply one or more processing algorithms to the multitude of electric input signals, or to one or more signals, originating therefrom. In addition to a noise reduction algorithm (or algorithms), the processor may be configured to apply a compressive amplification algorithm to compensate for a user's hearing impairment, a feedback control and/or echo cancelling algorithm, etc.

The at least one beamformer may comprise a time invariant, target-maintaining beamformer ($w^H$) and a time invariant, target-cancelling beamformer ($w_{tc}^H$), respectively. The target-maintaining beamformer ($w^H$) may be configured to maintain sound from a target direction, while attenuating sound from other directions (or to attenuate sound from other directions more than sound from the target direction). The target-cancelling beamformer ($w_{tc}^H$) may be configured to cancel (or maximally attenuate) sound from the target direction (e.g. a front of the user) while attenuating sound from other directions less.

The hearing device may further comprise a noise canceller comprising an adaptive filter for estimating an adaptive noise reduction parameter and providing a noise reduced target signal (y). The adaptive noise reduction parameter (β) may be configured to be applied to the spatially filtered signal from a target-cancelling beamformer. The output (b) of the target-cancelling beamformer ($w_{tc}^H$) may filtered by multiplying the (typically frequency dependent) adaptive parameter (β), onto the (typically frequency dependent) output (b) of the target-cancelling beamformer ($w_{tc}^H$), thereby providing an estimate of the noise component (NE) in the output of a time-invariant, target-maintaining beamformer ($w^H$). The noise estimate (NE) may subsequently be subtracted from an output (a) of the time-invariant, target-maintaining beamformer ($w^H$) (cf. e.g. FIG. 2, 3, 4A), thereby providing a noise reduced target signal (y).

The adaptive algorithm of the adaptive filter may comprise the complex sign Least Mean Squares (LMS) algorithm. The adaptive algorithm may be configured to determine the sign of the step size parameter in dependence of the output (b) of the target-cancelling beamformer ($w_{tc}^H$) and the noise reduced target signal (y).The complex sign (of a complex number x) may be defined as the sign of the real ($x_R$) and imaginary ($x_i$) part, i.e., $\mathrm{sign}(x)=\mathrm{sign}(x_R)+j\,\mathrm{sign}(x_i)$.

The hearing device may comprise a post filter providing a resulting noise reduced signal ($y_{NR}$) exhibiting a further reduction of noise in the target signal in dependence of the spatially filtered signals and optionally one or more further signals. The one or more further signals may e.g. comprise a noise estimation determined in dependence of the adaptive noise reduction parameter (β). The post filter may e.g. provide the resulting noise reduced signal in dependence of a noise estimation determined in dependence of the adaptive noise reduction parameter (β).

The hearing device may comprise an output transducer for converting the processed signal to stimuli perceivable by the user as sound. The hearing device may comprise a transmitter for transmitting the processed signal to another device, e.g. to a processing device (e.g. a computer or a personal (wearable) processing device), or to a communication device, e.g. a telephone, e.g. a smartphone.

The hearing device may be constituted by or comprise a hearing aid, e.g. an air-conduction type hearing aid, a bone-conduction type hearing aid, a cochlear implant type hearing aid, or a headset, or a combination thereof.

The hearing device, e.g. a hearing aid, may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing device may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid or an earpiece of a headset). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing device to another device, e.g. a far-end communication partner (e.g. via a network, e.g. in a telephone mode of operation of a hearing aid, or in a headset configuration).

The hearing device may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing device may comprise a directional microphone system adapted to spatially filter sounds from the environment, and thereby enhance a target acoustic source among a multitude of acoustic sources in the local environment of the user wearing the hearing device. The directional system may be adapted to detect (such as adaptively detect) from which direction a particular part of the microphone signal originates. This can be achieved in various different ways as e.g. described in the prior art. In hearing devices, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing device may comprise antenna and transceiver circuitry allowing a wireless link to an entertainment device (e.g. a TV-set), a communication device (e.g. a telephone), a wireless microphone, or another hearing device, etc. The hearing device may thus be configured to wirelessly receive a direct electric input signal from another device. Likewise, the hearing device may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing device can be of any type. The wireless link may be a link based on near-field communication, e.g.

an inductive link based on an inductive coupling between antenna coils of transmitter and receiver parts. The wireless link may be based on far-field, electromagnetic radiation. Preferably, frequencies used to establish a communication link between the hearing device and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology), or Ultra WideBand (UWB) technology.

The hearing device may be or form part of a portable (i.e. configured to be wearable) device, e.g. a device comprising a local energy source, e.g. a battery, e.g. a rechargeable battery. The hearing device may e.g. be a low weight, easily wearable, device.

The hearing device may comprise a 'forward' (or 'signal') path for processing an audio signal between an input and an output of the hearing device. A signal processor may be located in the forward path. The signal processor may be adapted to provide a frequency dependent gain according to a user's particular needs (e.g. hearing impairment). The hearing device may comprise an 'analysis' path comprising functional components for analyzing signals and/or controlling processing of the forward path. Some or all signal processing of the analysis path and/or the forward path may be conducted in the frequency domain, in which case the hearing device comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing device may comprise an analogue-to-digital (AD) converter to digitize an analogue input (e.g. from an input transducer, such as a microphone) with a predefined sampling rate, e.g. 20 kHz. The hearing devices may comprise a digital-to-analogue (DA) converter to convert a digital signal to an analogue output signal, e.g. for being presented to a user via an output transducer.

The hearing device, e.g. the input unit, and or the antenna and transceiver circuitry may comprise a transform unit for converting a time domain signal to a signal in the transform domain (e.g. frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing device from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing device may be split into a number NI of frequency bands (e.g. of uniform width), where NI is e.g. larger than 5, such as larger than 10, such as larger than 50, such as larger than 100, such as larger than 500, at least some of which are processed individually. The hearing device may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing device may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing device is reduced (e.g. to save power), e.g. to disable wireless communication, and/or to disable specific features of the hearing device.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing device may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE. The voice activity detector may be configured to be used as a noise-only detector.

The hearing device may comprise an own voice detector for estimating whether or not (or with what probability) a given input sound (e.g. a voice, e.g. speech) originates from the voice of the user of the system. A microphone system of the hearing device may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing device may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);

b) the current acoustic situation (input level, feedback, etc.), and c) the current mode or state of the user (movement, temperature, cognitive load, etc.);

d) the current mode or state of the hearing device (program selected, time elapsed since last user interaction, etc.) and/or of another device in communication with the hearing device.

The classification unit may be based on or comprise a neural network, e.g. a trained neural network.

The hearing device may comprise an acoustic (and/or mechanical) feedback control (e.g.

suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing device may further comprise other relevant functionality for the application in question, e.g. compression, noise reduction, etc.

The hearing device may comprise a hearing instrument, e.g. a hearing instrument adapted for being located at the ear or fully or partially in the ear canal of a user, a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing device as described above, in the 'detailed description of embodiments' and in the claims, is moreover provided. Use may be provided in a system comprising one or more hearing devices (e.g. hearing instruments (hearing aids)), headsets, ear phones, active ear protection systems, etc., e.g. in handsfree telephone systems, teleconferencing systems (e.g. including a speakerphone), public address systems, karaoke systems, classroom amplification systems, etc.

A method:

In an aspect, a method of operating a hearing device configured to be worn by a user is furthermore provided by the present application. The method comprises

- providing a multitude of electric input signal representing sound in the environment of the hearing device,
- providing a processed signal in dependence of said multitude of electric input signals, at least by providing a spatially filtered signal in dependence of said electric input signals, or signals originating therefrom, and beamformer filter coefficients, said beamformer filter coefficients being determined in dependence of a fixed steering vector comprising as elements respective acoustic transfer functions from a target signal source providing a target signal to each of said multitude of input transducers, or acoustic transfer functions from a reference input transducer among said multitude of input transducers to each of the remaining input transducers.

The method may further comprise providing compensation signals to compensate said multitude of electric input signals so that they match said fixed steering vector.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing device as described above, in the 'detailed description of embodiments', and in the claims, AND an auxiliary device is moreover provided.

The hearing system may be adapted to establish a communication link between the hearing device and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing device(s). The function of a remote control may be implemented in a smartphone, the smartphone possibly running an APP allowing to control the functionality of the hearing device via the smartphone (the hearing device(s) comprising an appropriate wireless interface to the smartphone, e.g. based on Bluetooth or some other standardized or proprietary scheme, e.g. UWB).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

The auxiliary device may be constituted by or comprise another hearing device (e.g. a hearing aid, or a further (second) earpiece of a headset). The hearing system may comprise two hearing aids adapted to implement a binaural hearing system, e.g. a binaural hearing aid system or two earpieces of a headset.

An APP:

In a further aspect, a non-transitory application, termed an APP, is furthermore provided by the present disclosure. The APP comprises executable instructions configured to be executed on an auxiliary device to implement a user interface for a hearing device or a hearing system described above in the 'detailed description of embodiments', and in the claims. The APP may be configured to run on cellular phone, e.g. a smartphone, or on another portable device allowing communication with said hearing device or said hearing system.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1A:
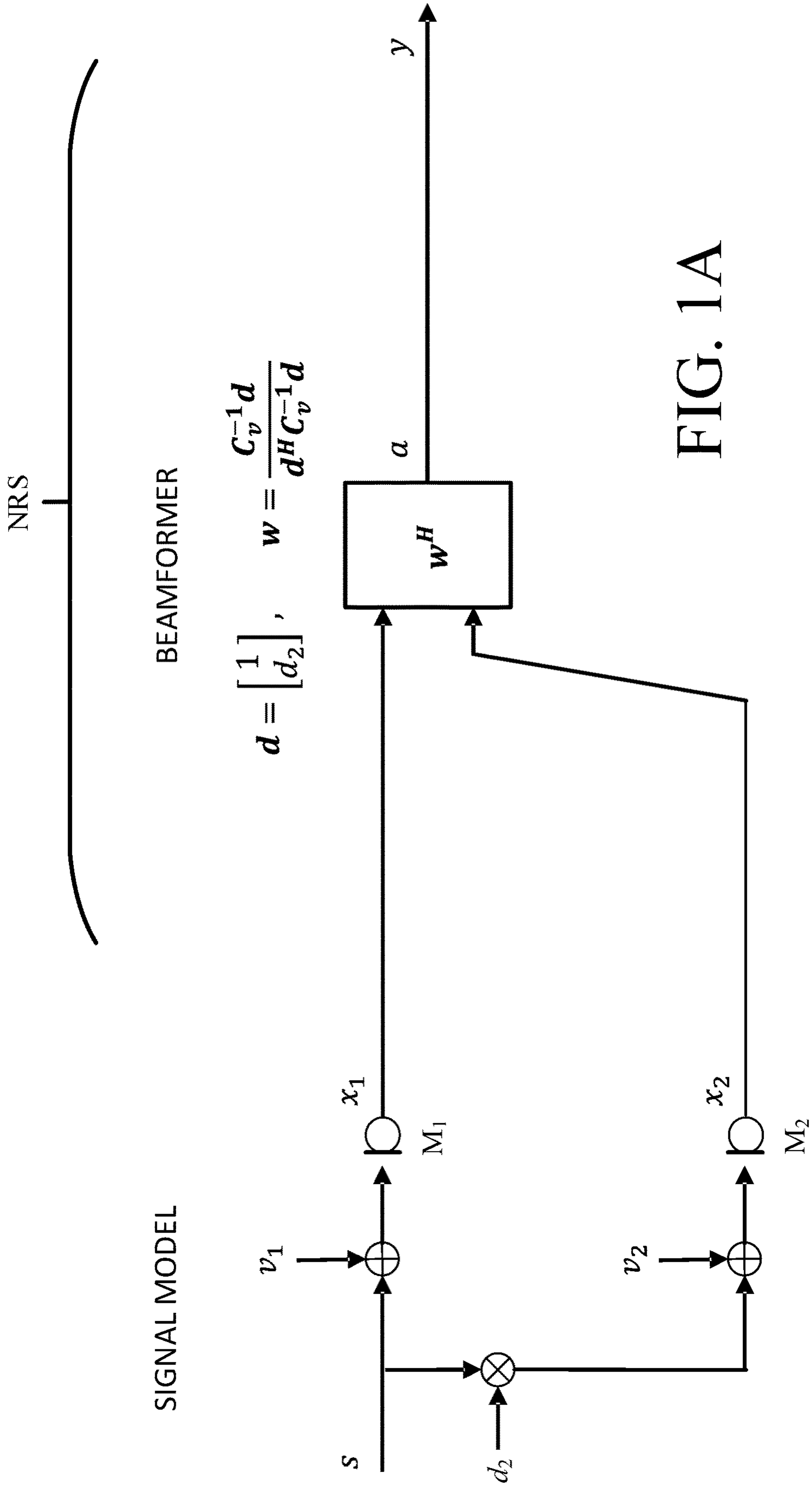
FIG. 1A shows a first embodiment of time-invariant noise reduction system comprising a target-maintaining beamformer.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing assistive devices, such as headsets or hearing aids.

In hearing assistive devices, it is desirable to capture and enhance speech for different applications.

An efficient way of enhancing speech is to use multichannel noise reduction techniques such as beamforming. The purpose of the beamforming system is two-fold: pass the speech signal without distortion, while suppressing the less important background noise to a certain level.

A time-invariant beamformer may be a good baseline for a noise reduction system, if it is possible to make reasonable prior assumptions about the target and the background noise. In a hearing aid system, it may be a fair assumption that the target is impinging from the front of the user wearing the hearing aid system. In a headset use case, on the other hand, it is a fair assumption that wanted (target) speech is coming from the user's mouth and that all sources in other directions and distances are assumed to be noise sources.

In a speakerphone use case, target speech may generally impinge on the microphones from any direction (which may dynamically change). In a speakerphone, a multitude (e.g. four) of fixed directions may be defined and a fixed beamformer be implemented for each direction.

FIG. 1 shows a first embodiment of time-invariant noise reduction system comprising a target-maintaining beamformer. The noise reduction system comprises a time-invariant beamformer ($w^H$) connected to a multitude (here two) of input transducers (here microphones ($M_1$, $M_2$)), each converting an acoustic input signal at its input to an electric input signal ($x_1$, $x_2$), where superscript $^H$ denotes Hermitian transposition. The beamformer weights are denoted $w^H$ (rooted in the fact that the weights are complex conjugated and transposed, when multiplied to the input signals).

The leftmost part of FIG. 1A (and FIG. 1B, 2, 3) denoted 'SIGNAL MODEL' schematically indicates a signal model for acoustic propagation of a target signal from a target signal source (TS) to the respective input transducers, and the addition of noise ($v_1$, $v_2$) at the respective input transducers. A reference microphone among the microphones connected to the noise reductions system (e.g. microphones of a hearing device) may be selected. Here microphone $M_1$ is selected as the reference microphone. The reference microphone may e.g. be selected as the microphone, which is expected to pick up most energy from the target direction. In the notation of FIG. 1A (1B, 2, 3), the acoustic input signal ($x_1$) at the reference microphone ($M_1$) is equal to the sum of the target signal (s) and the additive noise ($v_1$) (both as received at the reference microphone), i.e. $x_1=s+v_1$. At the (non-reference) further microphone ($M_2$), the acoustic input signal ($x_2$) is equal to the sum the target signal (s) at the reference microphone ($M_1$) times the (relative) acoustic transfer function ($d_2$) from the reference microphone ($M_1$) to the further microphone ($M_2$) and the additive noise ($v_2$), i.e. $x_2=s \cdot d_2+v_2$. On the 'electrical side' of the two microphones ($M_1$, $M_2$), the first and second electric input signals can likewise be written as $x_1=s+v_1$ and $x_2=s \cdot d_2+v_2$, respectively, or in a vector expression $x=s \cdot d+v$, where $x=[x_1, x_2]^T$, $d=[1, d_2]^T$ and $v=[v_1, v_2]^T$. In FIG. 1A (1B, 2, 3), two input transducers (microphones) are shown, but this number (M) may be larger, e.g. three or more, or four or more, etc., in which case the signal model would be the same, but the vectors having dimension M: $x=[x_1, x_2, \ldots, x_M]^T$, $d=[1, d_2, \ldots, d_M]^T$ and $v=[v_1, v_2, \ldots, v_M]^T$.

Figure 1B:
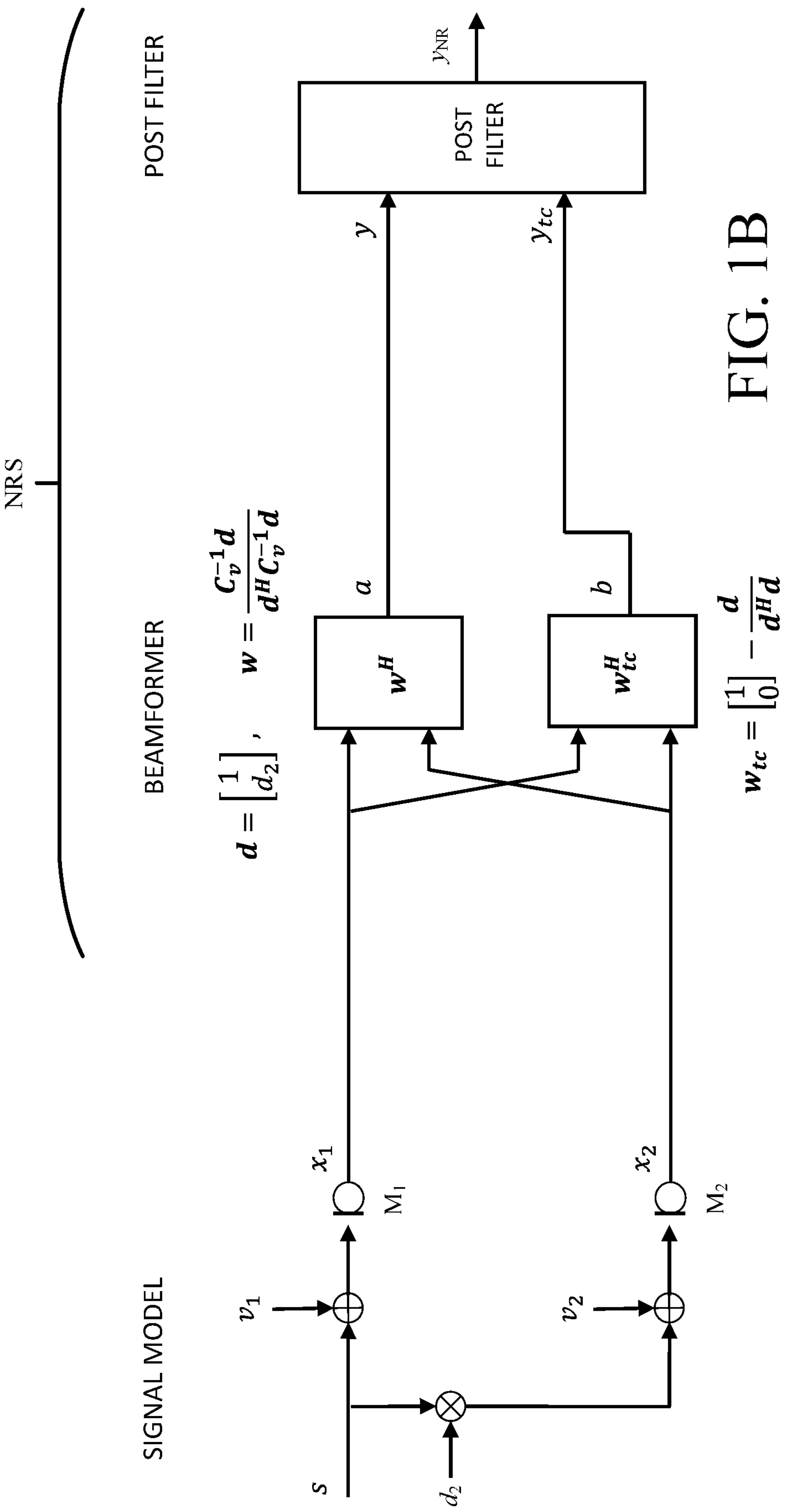
FIG. 1B shows a second embodiment of time-invariant noise reduction system comprising respective target-maintaining and target-cancelling beamformers and a post filter.
Figure 2:
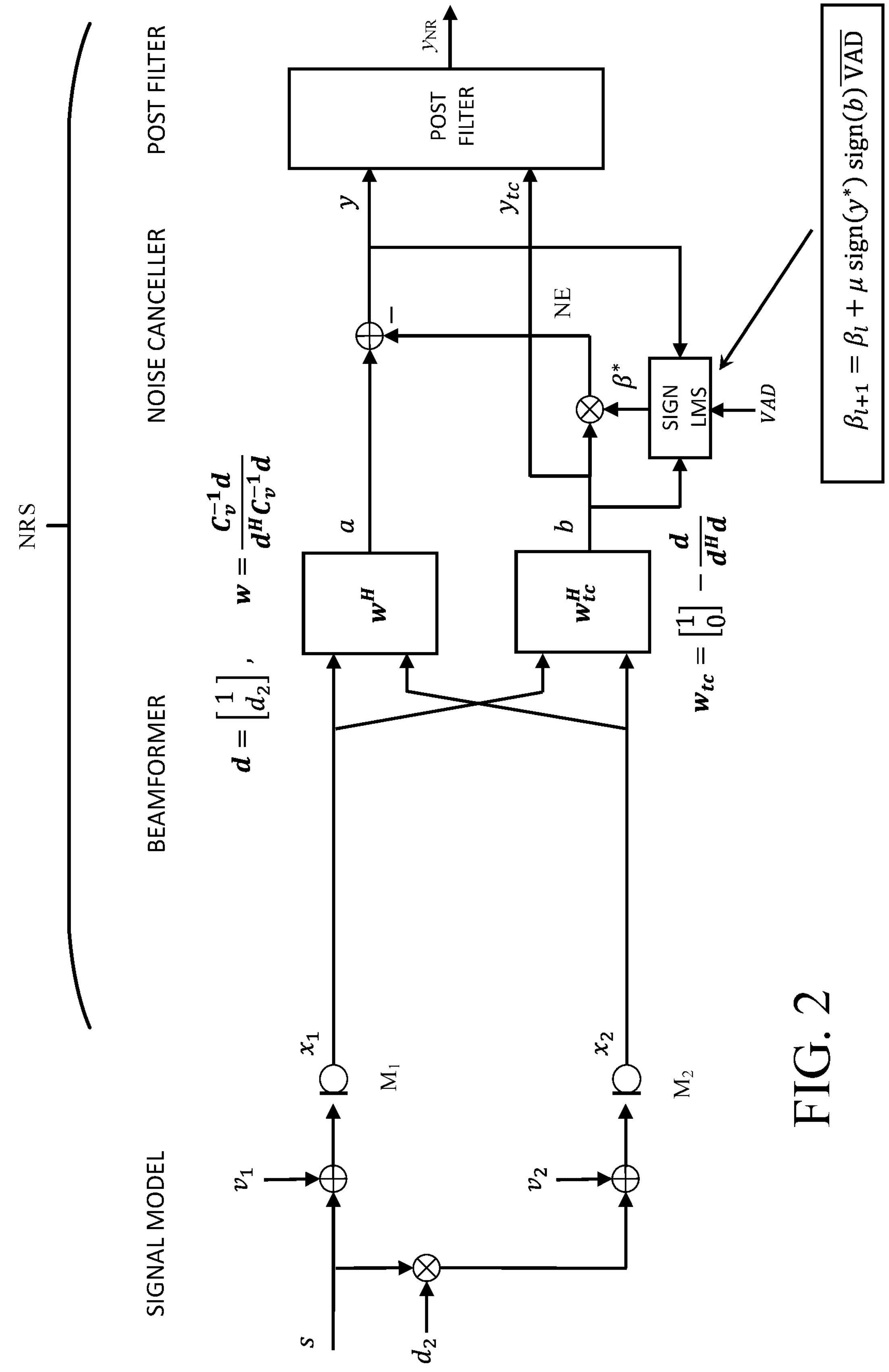
FIG. 2 shows an embodiment of time-invariant noise reduction system comprising respective target-maintaining and target-cancelling beamformers and a post filter, further including noise field adaptation according to the present disclosure.
Figure 3:
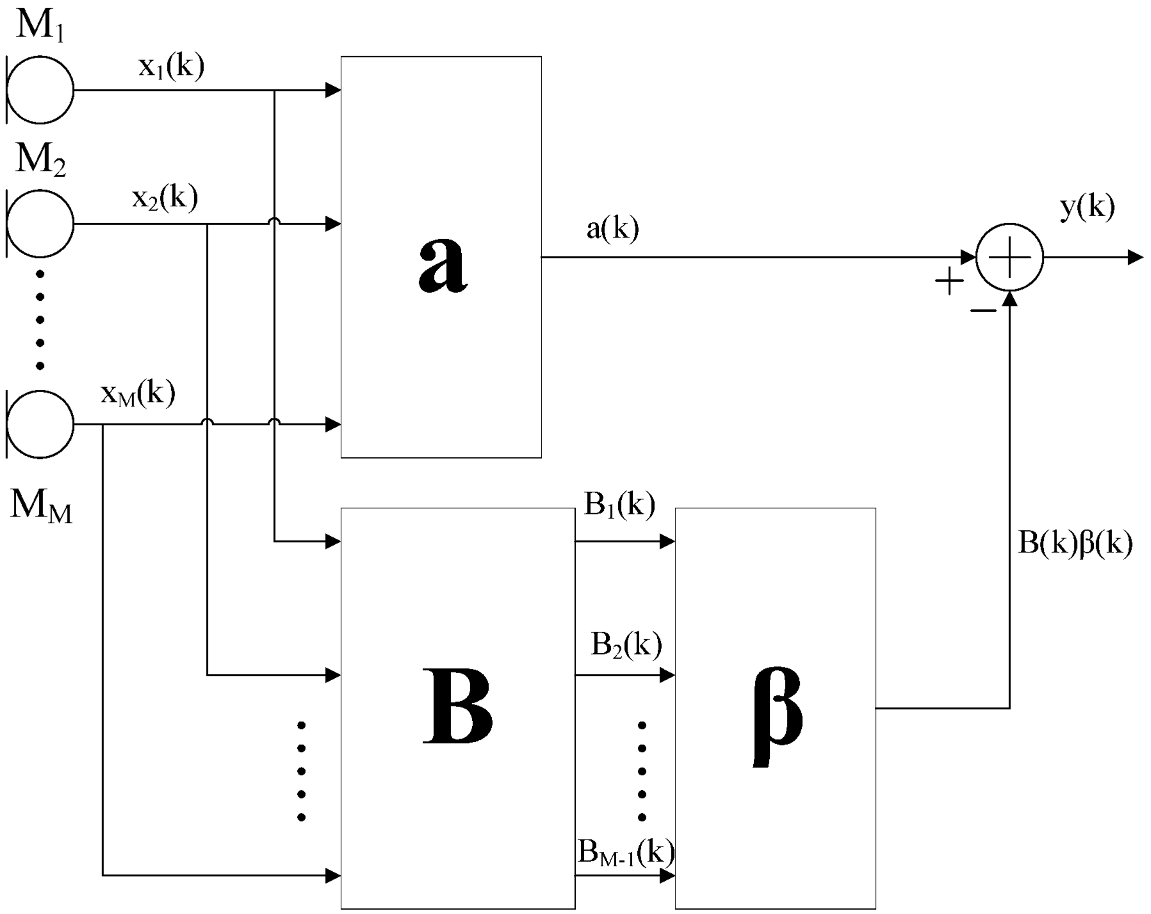
FIG. 3 shows multi-microphone input beamformer of the generalized sidelobe canceller structure.

After ('downstream of') the input stage denoted 'SIGNAL MODEL' a section termed 'BEAMFORMER' is included in FIG. 1A (and FIG. 1B, 2, 3). The section 'BEAMFORMER' schematically indicates beamformer (of different kinds in the respective embodiments of FIG. 1A, 1B, 2, 3). In the embodiment of FIG. 1A (1B, 2), the first and second electric input signals ($x_1$, $x_2$) from first and second microphones ($M_1$, $M_2$) are fed to the time-invariant beamformer ($w^H$) of the noise reduction system. The time-invariant beamformer applies (fixed), generally complex, filter coefficients (w) to the first and second electric input signals and provides a spatially filtered signal (a) as a weighted combination of the first and second electric input signals ($x_1$, $x_2$), where the weights are the filter coefficients (w) of the beamformer. In other words, $a=w_1 \cdot x_1+w_2 \cdot x_2$, where $w_1$ and $w_2$ are the filter coefficients ($w=[w_1, w_2]^T$), and where the filter coefficients of an MVDR beamformer (in general) are determined as $$w = \frac{C_v^{-1} d}{d^H C_v^{-1} d}$$

where $C_v$ is the (inter-microphone) noise covariance matrix for the current noise field (e.g. based on an assumption, e.g. isotropy, of the noise). In MVDR beamforming, e.g., the microphone signals are processed such that the sound impinging from a target direction at a chosen reference microphone is unaltered ('distortionless') by the beamformer. In the embodiment of FIG. 1A, a single beamformer (denoted ($w^H$)) provides the spatially filtered signal (a). The output signal (y) of the noise reduction system (indicated by bracket denoted NRS in FIG. 1A, 1B, 2, 3) of the embodiment of FIG. 1A is equal to the spatially filtered signal (a) from the beamformer ($w^H$).

1) Robust Time-Invariant Beamformer:

The purpose of the exemplary time-invariant beamformer shown in FIG. 1A is to provide a "best possible beamformer" such that it captures the target signal with only little distortion "on average". 'Robustness' may e.g. in the present context be taken to mean a better average performance compared to peak performance. The beamformer will not "collapse" in case of suboptimal conditions—it will perform "ok". In other words, the solution is a trade-off between performance and adaptation to individual variations.

The term "On average" is taken to mean that acoustical and device variations are considered (taken into account). This could be variations related to device placement, individual head- and torso acoustics (user variations, head size, ears, motion, vibrations, etc.), variations in device and production tolerances (microphone sensitivity assembly, plastics, ageing, deformation, etc). "On average" may be taken to mean that we do not adapt to individual differences but rather estimate a set of parameters which have the best performance across different variations. If we only have one set of parameters (weights) we aim at a high average performance for most individuals rather than possibly achieving even higher performance for a few and lower performance for many.

Additionally, this embodiment of a time-invariant beamformer requires an assumption on the noise field. If no specific assumptions can be made, the uncorrelated noise (i.e., microphone noise) and/or isotropic noise field (noise is equally likely and occurs with the same intensity from any direction) assumption is often used.

An initial representation of the actual noise field is obtained by a robust target-cancelling beamformer $w_{tc}$, i.e., a spatial filter/beamformer which "on average" provides as much attenuation of the target component as possible, leaving the rest of the input sound field unaltered as much as possible. This provides a good representation of the background noise as input to an adaptive noise canceller. This is illustrated in FIG. 1B.

FIG. 1B shows a second exemplary embodiment of a noise reduction system (NRS) comprising respective (time invariant) target-maintaining and target-cancelling beamformers (denoted ($w^H$) and ($w_{tc}^H$), respectively) and a (time-variant) post filter (POST FILTER). The target-maintaining beamformer ($w^H$) is described above. The target-cancelling beamformer is configured to cancel (or maximally attenuate) sound from the target direction (e.g. a front of the user) while attenuating sound from other directions less. The filter weights of the (two-input) target-cancelling beamformer og FIG. 1B may be determined as $$w_{tc} = \begin{bmatrix} 1 \\ 0 \end{bmatrix} - \frac{d}{d^H d}$$

Where d is an acoustic transfer function vector for sound from the target signal source to the microphones ($M_1$, $M_2$) of the hearing device (e.g. comprising relative transfer functions (RTF or d) for propagation of sound impinging on the reference microphone (MO from the target sound source). In the two-microphone example of FIG. 1B, the relative transfer function vector d can be written as, d=[1, $d_2]^T$, where $d_2$ is the transfer function (e.g. termed 'absolute transfer function' $ATF_2$) of sound from the target sound source to the second microphone ($M_2$) relative to the transfer function ($ATF_1$) of sound from the target sound source to the reference microphone ($M_1$) (as also described above for the time-invariant beamformer). The target-cancelling beamformer ($w_{tc}^H$) provides spatially filtered signal (b) as a weighted combination of the first and second electric input signals ($x_1$, $x_2$), where the weights are the filter coefficients ($w_{tc}$) of the target-cancelling beamformer. The spatially filtered signals (a, b) from the target-maintaining and target-cancelling beamformers (($w^H$) and ($w_{tc}^H$), respectively) are fed to the post filter (POST FILTER), e.g. providing further reduction of noise in the target signal in dependence of the spatially filtered signals and possibly one or more further (control) signals. The post filter provides a resulting noise reduced signal ($y_{NR}$).

Time-invariant beamformers may e.g. be designed using the Minimum Variance Distortionless Response (MVDR) objective with an average steering vector and uncorrelated or isotropic noise assumption. Regarding the meaning of an 'average steering vector', it may refer to an average across users' heads, wearing styles, etc., as e.g. indicated above regarding the term 'on average' and in the next paragraph regarding the MVDR formula. More general objective functions may be formulated for robustness against steering vector variations. This objective function can be solved by numeric optimization methods, where data and or models of variability are employed.

The MVDR formula for determining beamformer filter coefficients $$w = \frac{C_v^{-1} d}{d^H C_v^{-1} d}$$

requires the steering vector d as input parameter. The steering vector represents a transfer function between a reference microphone and the other microphones for a given impinging sound source.

The transfer function may include head-related impulse responses, i.e. taking into account that the microphones are placed on a head, e.g. on a hearing aid shell mounted behind the pinna or in the pinna.

An average steering vector d may represent a transfer function estimated across an average head. Or it may represent a transfer function which on average across individuals performs well, e.g. in terms of maximizing the directivity (or other performance parameters) across individuals.

2) Noise Field Adaptation:

The noise field adaption may be seen as an add-on to the time-invariant (fixed) beamformer in section 1) above. Since the time-invariant beamformer is optimal for uncorrelated noise or isotropic noise fields, noise field adaptation may be employed to achieve a more optimal beamformer with respect to the actual noise field. This requires adaptation to the noise field.

An adaptive noise cancelling system may be employed, where the output (b) of the target-cancelling beamformer ($w_{tc}^H$) is filtered (cf. multiplication unit ('x') and adaptive parameter ($\beta^*$), where * in $\beta^*$ indicates complex conjugate such that it provides an estimate of the noise component (NE) in the output of the time-invariant beamformer (($w^H$) from section 1 and FIG. 1A, 1B) above. This noise estimate (NE) is subsequently subtracted from the output (a) of the time-invariant beamformer ($w^H$). This is illustrated in FIG. 2.

The time-invariant beamformer may be defined by $$w = \frac{C_v^{-1} d}{d^H C_v^{-1} d},$$

where $C_v$ is a diagonal matrix. Thereby a solution which minimizes internal (microphone) noise is provided.

FIG. 2 shows an embodiment of time-invariant noise reduction system (NRS) comprising respective target-maintaining and target-cancelling beamformers and a post filter (cf. FIG. 1B), further including noise field adaptation according to the present disclosure, cf. section denoted 'NOISE CANCELLER' in FIG. 2. The embodiment of FIG. 2 is equal to the embodiment of FIG. 1B, but additionally contains the adaptive noise cancelling stage ('NOISE CANCELLER').

The filter coefficients (of the filter applied to the microphone signals; i.e. the resulting weights applied to each microphone signal are the (frequency-dependent) filter coefficients) may, e.g., be adapted using a complex sign LMS algorithm (denoted 'SIGN LMS' in FIGS. 2 (and 3)), which has very low complexity. It may also be implemented using other adaptive filter configurations (cf. e.g. references [1, 2]). The adaptation is performed in noise only periods as indicated by a detector (denoted 'VAD' in FIGS. 2 (and 3)) that identifies noise only periods.

The adaptive SIGN LMS algorithm may e.g. provide the adaptive parameter according to the following recursive expression:

$$\beta_{l+1} = \beta_l + \mu \,\mathrm{sign}(y^*)\mathrm{sign}(b)\overline{\mathrm{VAD}}$$

where l is a time index, μ is a step size of the adaptive algorithm and $\overline{\mathrm{VAD}}$ denotes 'Not Voice activity' (in other words noise only periods, e.g. provided by a voice activity detector). The parameter $\overline{\mathrm{VAD}}$ may e.g. take on values 1 and 0 for 'Noise only' and 'Not voice only', respectively (or it may assume a probability of the 'Noise only' (e.g. assuming values between 0 and 1). The sign(y*) is the sign of the values of the (further) noise reduced output (y=a−NE (complex transposed)) of the output (a) of the time-invariant beamformer ($w^H$). The sign(b) is the sign of the complex value of the output of the time-invariant target-cancelling beamformer ($w_{tc}^H$).

The sign of a complex value $x_c$ is here defined as:

$$\text{sign}(x_c)=\text{sign}(\text{Re}(x_c))+j\,\text{sign}(Im(x_c)),$$

where the sign of a real value $x_r$ is defined as $$\text{sign}(x_r)=\begin{cases}1 & ;x\geq 0\\ -1 & ;x<0\end{cases}$$

The complex sign real and imaginary parts sign(Re($x_c$)), sign(Im($x_c$)) can only take on values −1, or +1.

The notation used above for beamformers ($w^H$, $w_{tc}^H$) and adaptive parameter β* is the common academic textbook notation. This means that the filter operations of the type $y=w^Hx$ are implemented as $y=\tilde{w}^T x$ where $\tilde{w}=w^*$, i.e. the weights are pre-conjugated.

Furthermore, the adaptation of filter weights is done such that they compute conjugated weights. So, the complex sign-sign adaptation of beta in an implementation will compute the conjugated beta $\tilde{\beta}$:

$$\tilde{\beta}_{l+1}=\tilde{\beta}+\mu\ \text{sign}(y)\text{sign}(b^*)\overline{\text{VAD}}$$

The purpose of this is to reduce the number of conjugation operations (to thereby reduce computational complexity, which is important for miniature devices, such as hearing aids).

The NLMS update of beta is given by $$\beta_{l+1}=\beta_l+\mu\frac{y^*b}{|b|^2}\overline{VAD}$$

This calculation requires a division (which is expensive and good to avoid). If we solely consider the sign(y*b)=sign (y*)sign(b), as proposed in the present disclosure, we still get the gradient direction correct. However, the gradient step size may not be optimal. So, an advantage is to provide a decreased computational complexity (by avoiding the division operation).

As the proposed algorithm adapts to the noise, we get an improved noise estimate compared to a set of fixed weights, which is only optimal for the "average" noise.

The accuracy of the filter coefficients may be improved by only updating it in noise-only periods. In order to achieve this a negated target detector output (cf. $\overline{\text{VAD}}$ above, cf. e.g. FIG. 8), or noise-only detector may be used. In a head-set application, a negated own voice detector may be used. Also, the far end signal input of a head set (or a hearing aid in a communication mode) may be used to identify periods without target signal, assuming there is no double talk.

The voice detector/own voice detector may be frequency band specific, or it may be implemented as a broad band detector (at a given time having the same value for all frequency bands).

If the time-invariant beamformer was designed without a steering vector (i.e., by using other objective functions than the MVDR), a $d_2$ value may be computed for any 2-microphone time-invariant beamformer w using $$d_2=\frac{1-w_1^*}{w_2^*},$$

where $d_1=1$ and $w^Hd=1$. The corresponding target-cancelling beamformer may be found by computing $$w_{tc}=\begin{bmatrix}1\\0\end{bmatrix}-\frac{d}{d^Hd},$$

where $d=[1, d_2]^T$

The formula for the beamformer weights of an MVDR beamformer $$w=\frac{C_v^{-1}d}{d^HC_v^{-1}d}$$

is a general formula, which is valid for M micropnones. but also in the case where a noise estimate is subtracted from the distortion less signal can be generalized (often termed generalized sidelobe canceller, GSC), as described in the following.

FIG. 3 illustrates a multi-microphone system comprising a multi-input beamformer of the generalized sidelobe canceller structure (GSC).

The above equation for $w_{tc}$ is actually a special case for M=2 of the target cancelling beamformer, where the adaptive beamformer weights are defined as $$w_{GSC}(k)=a-B\beta,$$

Where a typically is a time-invariant M×1 delay-and-sum beamformer vector not altering the target signal direction, and B is a time-invariant blocking matrix of size M×(M−1), and β is an (M−1)×1 adaptive filtering vector.

Matrix B is found by taking M−1 columns from matrix H, which is defined as:

$$H=I-\frac{dd^H}{d^Hd}$$

The optimal adaptive coefficients given by (cf. e.g. [4])

$$\beta=(B^HC_vB)^{-1}B^HC_va,$$

where a and B are orthogonal to each other, i.e. $a^HB=0_{1\times(M-1)}$, and β is updated when speech is not present. The optimal beamformer weights are thus calculated as $$w_{GSC}(k)=a-B(B^HC_vB)^{-1}B^HC_va.$$

For the M>2 case, the term may also be estimated by a gradient update.

The complex sign-sign LMS update equation for the (M−1)×1 beta vector in the M>2 case is given by:

$$\beta_{l+1}=\beta_l+\mu\ \text{sign}(y^*)\text{sign}(b)\overline{\text{VAD}}$$

Where $b=B^Hx$, and where a and B are fixed and β is adaptive.

A disadvantage of a noise field adaptation is that any robustness errors of the time-invariant beamformers will be exaggerated, so the performance improvement of the noise field adaptation may be reduced dependent on how well the acoustic situation matches the time-invariant beamformers. In order to improve this behavior, the target steering adaptation as described below may be introduced.

3) Target Steering Adaptation:

The target steering adaptation may be seen as an add-on to the beamformer systems described in sections 1) and 2) above. The main idea is to filter the microphone signal(s) in such a way that the target component in the signals at the microphones acoustically matches the signal model (look vector) used to design the time-invariant beamformer. In other words, the purpose of the correction is to realign the signal in phase to meet the original beamformer design.

The main purpose of the target steering adaptation stage is to compensate for the acoustical and device variations to achieve improved capturing of the target speech and reduce the loss of the target signal. Furthermore, this compensation will improve the target-cancelling beamformer of the system described in section 2) above, in such way that the target signal is attenuated more.

The solution is related to look vector estimation for beamforming, but instead of computing a new beamformer based on an estimated steering vector, it is proposed that the inputs to an existing beamformer are compensated to match the look vector of the existing beamformer.

The solution comprises correction filters on all microphones except for the reference microphone. The correction filters are adapted using a complex sign LMS algorithm, where the error signal is computed using the steering vector of the fixed beamformer from section 1) above. The error signal quantifies the deviation between the actual acoustics compared to the signal model which is assumed by the beamformer.

In principle, the update of the compensation filter is only done when the microphone signal consists of the noise-free target signal. In practice, the update is performed, when it is most likely that the target signal is dominant. This is achieved by using a target speech detector.

A target speech detector may be based on the ratio of the target- and target-cancelling-beamformer output powers. In the case of own voice enhancement, magnitude of the error signal can be employed for characterization of the input, i.e., if the magnitude of the error signal is large, it is unlikely that the input speech is the user's own voice (might instead be an undesired external speech source).

Figure 4A:
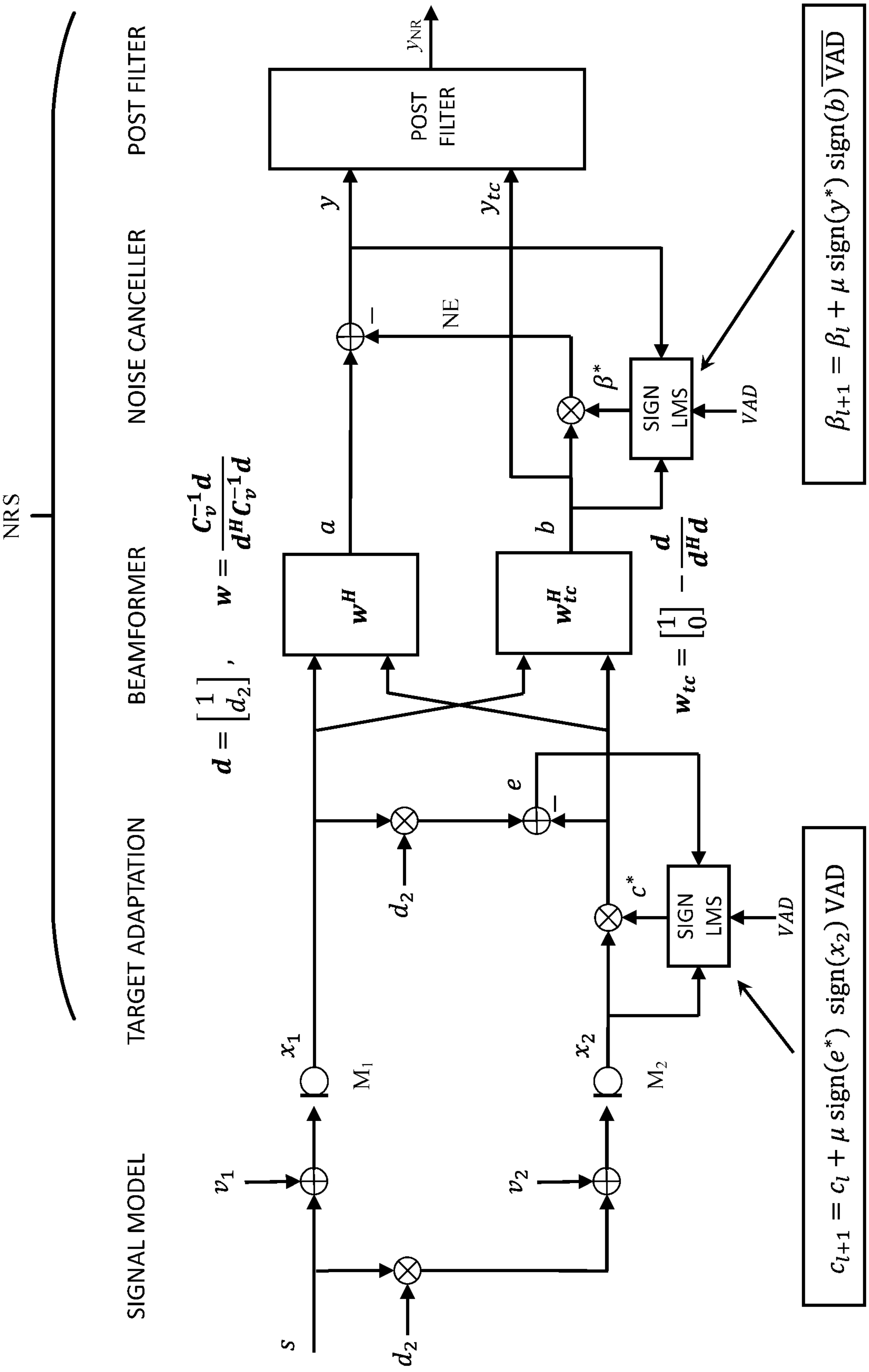
FIG. 4A shows a time-invariant noise reduction system comprising respective target-maintaining and target-cancelling beamformers and a post filter, further including noise adaptation and target steering adaptation according to the present disclosure.

FIG. 4A shows a time-invariant noise reduction system comprising respective target-maintaining and target-cancelling beamformers and a post filter, further including noise adaptation and target steering adaptation according to the present disclosure.

The algorithm requires the steering vector d, which is the time-invariant beamformers steering vector. For a time-invariant beamformers with more than 2 microphones, a steering vector is the vector d that fulfils $w^H d=1$ and $B^H d=0$, where $$H = I - \frac{dd^H}{d^H d},$$

and B is obtained by taking (any) M−1 (of the M) columns of H.

The purpose of the target estimation is to monitor how much the target signal deviates from the look vector which was used to compute the time invariant beamformers. This is done by computing an error signal corresponding to microphone signals 2, . . . , M.

$$e_m = x_1 - c^* x_m, \text{ for } m=2, \ldots M$$

where $x_m$ denotes the m-th microphone and c is a complex microphone correction coefficient. The correction coefficient is updated using a complex sign-sign LMS according to $$c_{m,t+1} = c_{m,t} + \mu \text{ sign}(e^*_m) \text{ sign}(x_m)\text{VAD}, \text{ for } m=2, \ldots, M$$

The update is done in time frequency regions with target activity only, l being a time index.

The step size μ of both LMS algorithms (for noise field adaptation and target steering adaptation, respectively) may be interdependent (e.g. equal). The step size μ of the two LMS algorithms may, however, be independently determined, e.g. so that the adaptation to the background noise may be set to be faster than the adaptation to a target. E.g. in the case of adapting to own voice, it may be advantageous to have a slower step size μ for the target adaptation.

The step size can also vary across frequency bands. The choice of the step size value is a trade-off between convergence speed and accuracy. Generally, the step-size is time-invariant, but may also be changed adaptively, based on estimates of the accuracy, e.g., the magnitude of the error signal.

4) Complex Sign LMS

In the following a low complexity implementation of the noise and target adaptation algorithms is proposed. The (non-complex) sign LMS algorithm is a well-known low complexity version of the LMS algorithm (cf. e.g. references [1], [2], [3]).

The Complex LMS refers to the LMS algorithm for complex data and coefficients.

The Sign LMS comes in many variants, and usually for real-valued data and weights cf. e.g. [3]):

| | |
|---|---|
| Signed Error LMS | $h(n+1) = h(n) + \mu\, x(n)\text{sign}(e(n))$ |
| Signed Data LMS | $h(n+1) = h(n) + \mu\, \text{sign}(x(n))e(n)$ |
| Sign-Sign LMS | $h(n+1) = h(n) + \mu\, \text{sign}(x(n))\text{sign}(e(n))$ |

In all these cases the sign operation for real values is given by $$\text{sign}(x_r) = \begin{cases} 1 & ; x \geq 0 \\ -1 & ; x < 0 \end{cases}$$

The Complex Sign LMS is simply a Sign LMS for complex valued data and coefficients.

For example, the Complex Sign-Sign algorithm $$h(n+1) = h(n) + \mu \text{ sign}(x(n))\text{sign}(e^*(n))$$

The complex sign (of a complex number x) may be given by taking the sign of the real ($x_R$) and imaginary ($x_I$) part, i.e., $\text{sign}(x)=\text{sign}(x_R)+j\text{sign}(x_I)$.

The Least Mean Square (LMS) update rule is given by $$h(n+1) = h(n) + \mu x(n) e^*(n),$$

where h(n) is the filter coefficient, x(n) is the filter input and e(n) is the error signal. The error signal is defined as $$e(n) = t(n) - h^*(n) x(n),$$

where t(n) is the desired signal.

The filter coefficient h(n) may e.g. only be updated when (own) voice is detected, e.g. only when the signal to noise ratio is greater than 5 dB or greater than 10 dB. The filter coefficient may only be updated when the error is small, i.e. if the filter coefficient is close to the desired transfer function d. Hereby adapting to directions which are not of interest is avoided.

The voice activity detector (VAD) may as well be based on a binaural criterion, e.g. combination on the VAD decision based on left-ear and right-ear devices.

The voice activity detector used for target adaptation may be different from the inverse voice activity detector which is used in the noise canceller to update the noise estimate (β).

The magnitude of the update step is dependent on the step-size μ, the input signal x(n) and the error signal e (n).

In the complex-sign LMS, the magnitude of the update step is only dependent on the step-size. The complex sign is given by taking the sign of the real and imaginary part, i.e., $\mathrm{sign}(x)=\mathrm{sign}(x_R)+j\,\mathrm{sign}(x_I)$. Applying the complex sign operator on e*(n) and x(n) normalizes the magnitude effectively to $\sqrt{2}$ and hence, the update no longer depends on the magnitude of e*(n) and x(n). The update rule for the complex-sign LMS is given by $$h(n+1)=h(n)+\mu\ \mathrm{sign}(x(n))\mathrm{sign}(e^*(n)).$$

A drawback of the Sign-Sign LMS is that if a very large step size is chosen to achieve fast convergence, the excess error is large and can lead to audible artifacts. This can be improved by a double filter approach, where we define a foreground and a background filter. The foreground filter is a fast-converging Complex Sign-Sign LMS filter (large step size).

$$e(n)=d(n)-h^*(n)x(n)$$

$$h(n+1)=h(n)+\mu\ \mathrm{sign}(x(n))\mathrm{sign}(e^*(n))$$

The background filter may be updated from the foreground coefficient according to the following rationale $$e_2(n)=d(n)-h_2^*(n)x(n)$$

$$h_2(n+1)=\begin{cases}(1-\alpha)h_2(n)+\alpha h(n+1) & |e(n)|<|e_2(n)|-\gamma\\ h_2(n) & \text{otherwise}\end{cases}$$

The output of the background filter $y(n)=h_2(n)x(n)$ is then used as the algorithm output signal. In words: the background filter is a smoothed version of the foreground filter when the foreground filter has a smaller error signal magnitude (with marginal γ), otherwise the background filter coefficient will not be updated. The smoothing operation is a common first order smoothing, where factor a is a smoothing coefficient.

The double filter can be used in the LMS algorithm in the precorrection as well as in the noise canceller.

Other metrics may be used to determine the input correction than the error signal e(n), e.g. a in the equation for $h_2(n+1)$ above. Or prior knowledge, or other evaluation parameters of the inputs (e.g. SNR).

Figure 4B:
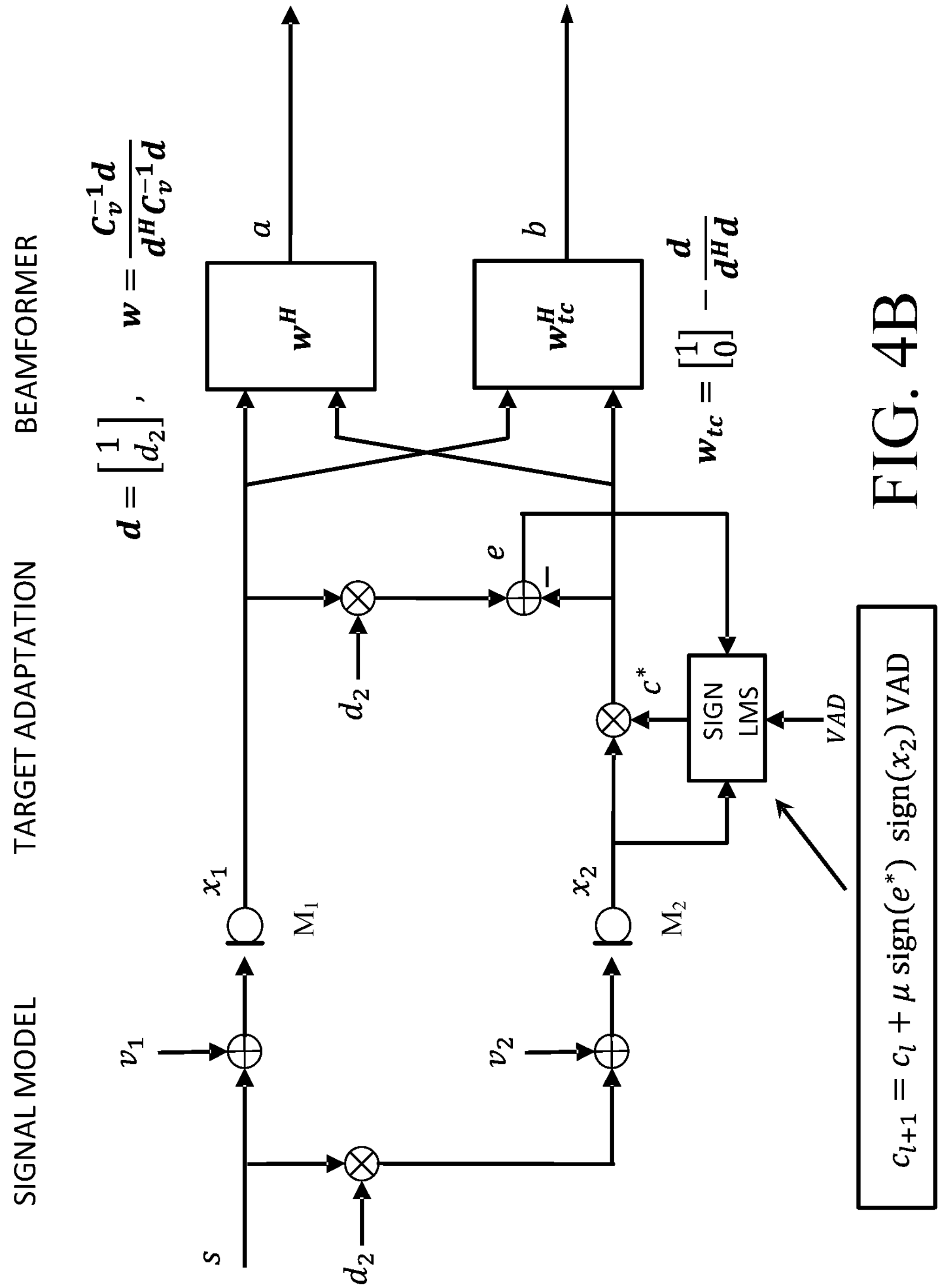
FIG. 4B shows a time invariant beamformer system comprising respective target-maintaining and target-cancelling beamformers and target steering adaptation according to the present disclosure.

FIG. 4B shows a time invariant beamformer system comprising respective target-maintaining and target-cancelling beamformers and target steering adaptation according to the present disclosure. The embodiment shown in FIG. 4B is similar to the embodiment of FIG. 4A but does not include the noise canceller module. Such beamformer-only structure may be useful in other applications than noise reduction, e.g. echo cancelling, own voice estimation (cf. e.g.

Figure 5A:
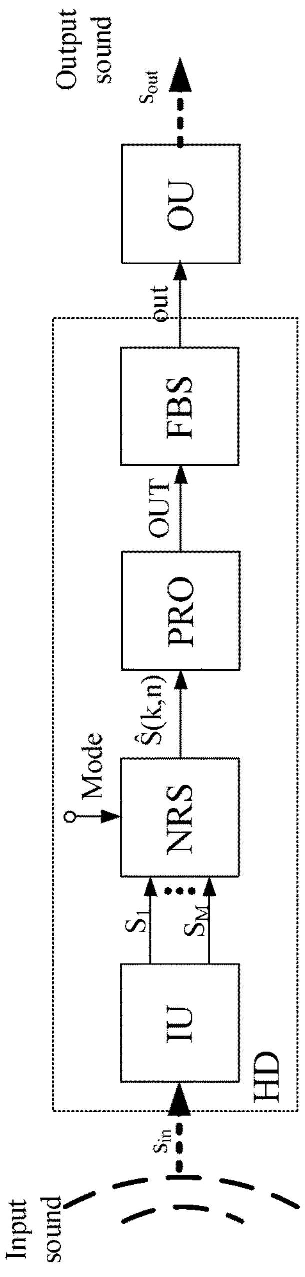
FIG. 5A shows an exemplary block diagram of a hearing device comprising a noise reduction system according to an embodiment of the present disclosure.
Figure 5B:
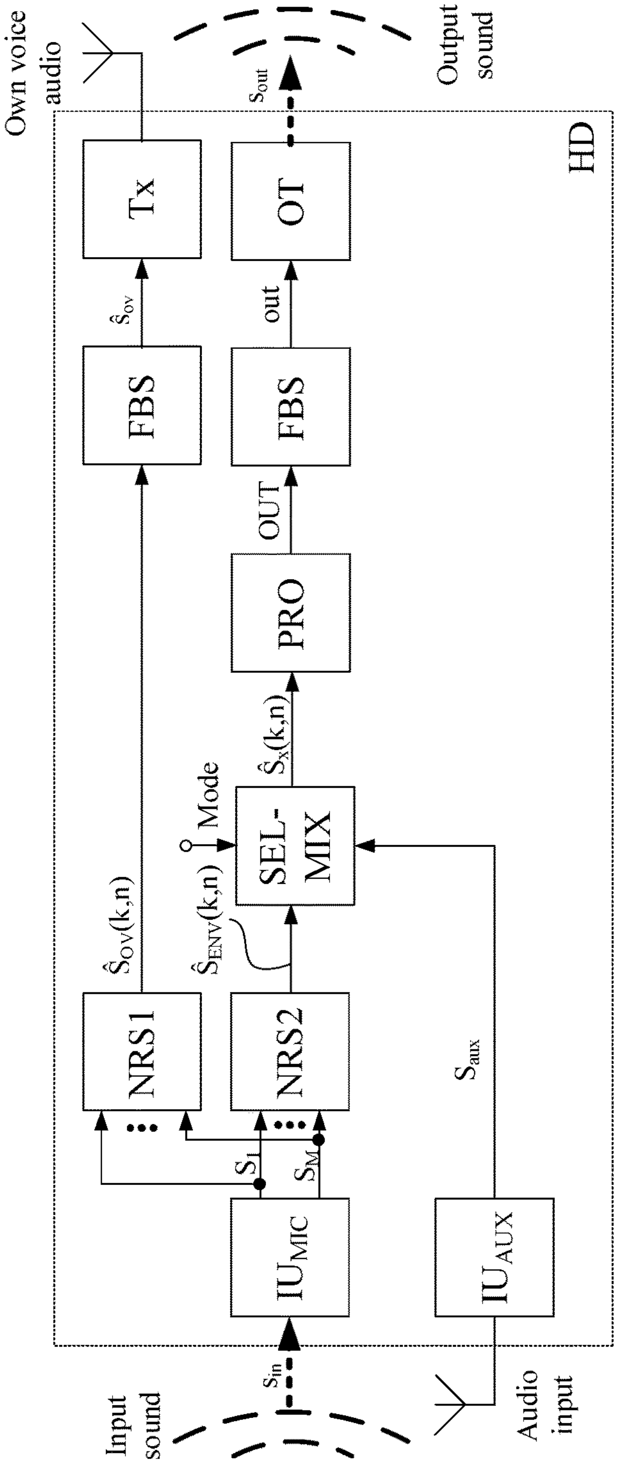
FIG. 5B shows an exemplary block diagram of a hearing device comprising a noise reduction system according to an embodiment of the present disclosure in a handsfree telephony or headset mode of operation.

Examples of Use of a Noise Reduction System According to the Present Disclosure:

FIG. 5A shows an exemplary block diagram of a hearing device, e.g. a hearing aid (HD), comprising a noise reduction system (NRS) according to an embodiment of the present disclosure (cf. e.g. FIG. 2, 3, 5). The hearing device comprises an input unit (IU) for picking up sound $s_{in}$ from the environment (e.g. by M input transducers, e.g. microphones) and providing a multitude (M, M>1) of electric input signals ($S_1, \ldots, S_M$) and a noise reduction system (NRS) for estimating a target signal $\hat{S}$ in the input sound $s_{in}$ based on the electric input signals and optionally further information, e.g. the mode control signal (Mode). The mode select input (Mode) may be configured to indicate a mode of operation of the system, e.g. of the beamformer(s) and/or the filter coefficient updating strategy, e.g. whether the target signal is the user's own voice or a target signal from the environment of the user (and possibly to indicate a direction to or location of such target sound source). The mode control signal may e.g. be provided from a user interface, e.g. from a remote control device (e.g. implemented as an APP of a smartphone or similar device, e.g. a smartwatch or the like). The mode control signal (Mode) may e.g. be automatically generated, e.g. using one or more sensors, e.g. initiated by the reception of a wireless signal, e.g. from a telephone. The output of the noise reduction system (NRS) may be an estimate of the user's voice $\hat{S}_{ov}$, or an estimate of a target sound from the environment $\hat{S}_{ENV}$, see e.g. FIG. 5B. The hearing device, e.g. a hearing aid or headset, further comprises a processor (PRO) for applying one or more processing algorithms to a signal of the forward path from input to output, e.g. (as here) to the estimate $\hat{S}$ of the target signal, provided by the noise reduction system, e.g. in a time-frequency representation ($\hat{S}(k,n)$). This may e.g. enabled by respective analysis filter banks (e.g. forming part of the input unit ($IU_{MIC}$), possibly together with respective analogue to digital converters, as appropriate) providing each of the electric input signals ($S_1, \ldots, S_M$) in a time frequency representation (k,n), k and n being frequency and time indices, respectively. The one or more processing algorithms may e.g. comprise a compression algorithm configured to amplify (or attenuate) a signal according to the needs of the user, e.g. to compensate for a hearing impairment of the user. Other processing algorithms may include frequency transposition, feedback control, etc. The processor (PRO) provides a processed output (OUT) that is fed to a synthesis filter bank (FBS) for conversion from the time-frequency representation (frequency domain) to the time domain. Time domain output signal (out) is fed to an output unit (OU) for conversion to stimuli $s_{out}$ perceivable by the user as sound (Output sound), e.g. acoustic vibrations (e.g. in air and/or skull bone) or electric stimuli of the cochlear nerve (in which (latter) case, the synthesis filter bank (FBS) may be omitted). In a non-hearing aid, e.g. headset application, the processor may be configured to further enhance the signal from the noise reduction system or be dispensed with (so that the estimate $\hat{S}$ of the target signal is fed directly to the synthesis filter bank/output unit). The target signal may be the user's own voice, and/or a target sound in the environment of the user (e.g. a person (other than the user) speaking, e.g. communicating with the user).

FIG. 5B shows an exemplary block diagram of a hearing device, e.g. a hearing aid (HD), comprising a noise reduction system (NRS) according to an embodiment of the present disclosure (cf. e.g. FIG. 2, 4A, 6) in a 'handsfree telephony' or 'headset' mode of operation. The embodiment of FIG. 5B comprises the functional blocks described in connection with the embodiment of FIG. 5A. Specifically, however, the embodiment of FIG. 5B is configured—in a particular communication mode—to implement a wireless headset allowing a user to conduct a spoken communication with a remote communication partner. In the particular communication mode of operation (e.g. a telephone mode), the hearing aid is configured to pick up a user's voice using electric input signals provided by the input unit ($IU_{MIC}$) and to provide an estimate $\hat{S}_{OV}(k,n)$ of the user's voice using a first noise reduction system (NRS1) according to the present disclosure, and to transmit the estimate (after conversion by synthesis filter bank (FBS) to time domain signal $\hat{s}_{ov}$) via transmitter (Tx) and antenna circuitry (cf. Own voice audio)

to another device (e.g. a telephone or similar device) or system, e.g. via a synthesis filter bank (FBS) and appropriate transmitter (Tx) and antenna circuitry.

Additionally, the hearing aid (HD) comprises an auxiliary audio input (Audio input) configured to receive a direct audio input (e.g. wired or wirelessly) from another device or system, e.g. a telephone (or similar device). In the embodiment of FIG. 5B, a wirelessly received input (e.g. a spoken communication from a communication partner) is shown to be received by the hearing aid via antenna and input unit ($IU_{AUX}$). The auxiliary input unit ($IU_{AUX}$) comprises appropriate receiver circuitry, an analogue-to-digital converter (if appropriate), and an analysis filter bank to provide audio signal, $S_{aux}$, in a time-frequency representation as frequency sub-band signals $S_{aux}(k,n)$. The forward path of the hearing aid of FIG. 5B comprises the same components as described for the embodiment of FIG. 5A and additionally a selector-mixer (SEL-MIX) allowing the signal of the forward path (which is processed in the processor (PRO) and presented to the user as stimuli perceivable as sound) to be configurable. In control of the Mode control signal (Mode), the output $S_x(k,n)$ of the selector-mixer (SEL-MIX) can be a) the environment signal $S_{ENV}(k,n)$ (e.g. an estimate of a target signal in the environment, or an omni-directional signal, e.g. from one of the microphones), b) the auxiliary input signal $S_{aux}(k,n)$ from another device, or c) a mixture (e.g. a (possibly configurable, e.g. via a user interface) weighted mixture) thereof. As the embodiment of FIG. 5A, the forward path of the embodiment of FIG. 5B comprises a synthesis filter bank (FBS) configured to convert a signal in the time-frequency domain, represented by a number of frequency sub-band signals (here signal OUT(k,n) from the processor (PRO) to a signal (out) in the time domain. The hearing aid (forward path) further comprises an output transducer (OT) for converting output signal (out) to stimuli ($s_{out}$) perceivable by the user as sound (Output sound), e.g. acoustic vibrations (e.g. in air and/or skull bone). The output transducer (OT) may comprise a digital-to-analogue converter as appropriate.

The first noise reduction system (NRS1) is configured to provide an estimate of the user's own voice $\hat{S}_{OV}$. The first noise reduction system (NRS1) may comprise own voice maintaining beamformer and an own voice cancelling beamformer (cf. e.g. FIG. 8). The own voice cancelling beamformer comprises the noise sources when the user speaks. The own voice maintaining and an own voice cancelling beamformers may be time-invariant as proposed according to the present disclosure. The first noise reduction system (NRS1) may be a noise reduction system according to the present disclosure.

The second noise reduction system (NRS2) may be configured to provide an estimate of a target sound source (e.g. a voice $\hat{S}_{ENV}$ of a speaker in the environment of the user). The second noise reduction system (NRS2) may comprise an environment target source maintaining beamformer and an environment target source cancelling beamformer, and/or an own voice cancelling beamformer. The target-cancelling beamformer comprises the noise sources when the target speaker (in the environment) speaks. The own voice cancelling beamformer comprises the noise sources when the user speaks. The second noise reduction system (NRS2) may be a noise reduction system according to the present disclosure.

FIG. 5B may represent an ordinary headset application, e.g. by separating the microphone to transmitter path ($IU_{MIC}$-Tx) and the direct audio input to loudspeaker r path ($IU_{AUX}$-OT). This may be done in several ways, e.g. by removing the second noise reduction system (NRS2) and the selector mixer (SEL-MIX), and possibly the synthesis filter bank (FBS) (if the auxiliary input signal $S_{aux}$ is processed in the time domain), to feed the auxiliary input signal $S_{aux}$ directly to the processor (PRO), which may or (generally) may not be configured to compensate for a hearing impairment of the user.

Figure 6:
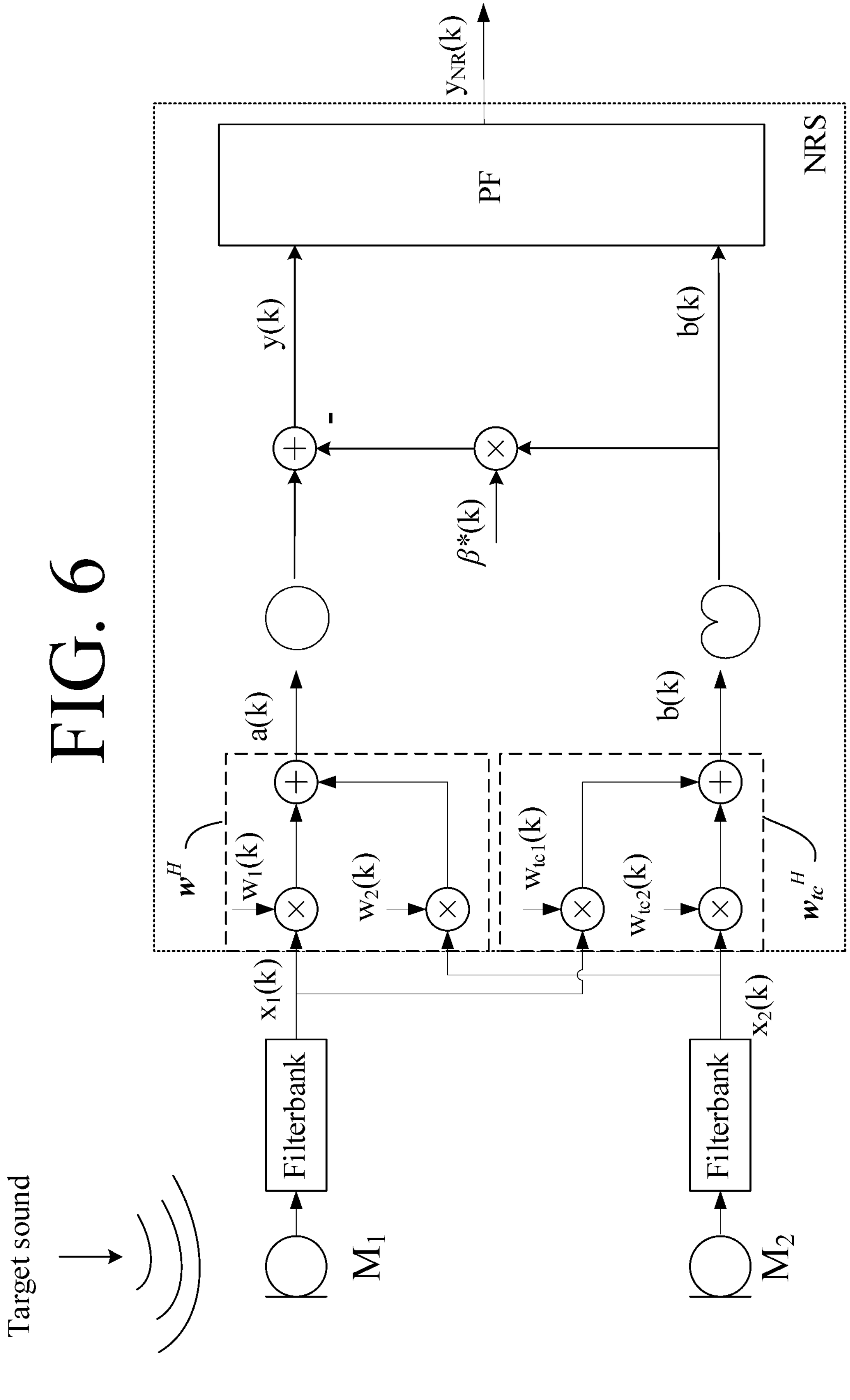
FIG. 6 shows an embodiment of the time-invariant noise reduction system comprising respective time invariant target-maintaining and target-cancelling beamformers and a post filter, further including noise field adaptation according to the present disclosure.

FIG. 6 shows an embodiment of the time-invariant noise reduction system comprising respective time invariant target-maintaining and target-cancelling beamformers and a post filter, further including noise field adaptation according to the present disclosure. The embodiment of FIG. 6 is similar to the embodiment of FIG. 2. In the embodiment of FIG. 6, exemplary embodiments of the time invariant target-maintaining and target-cancelling beamformers are illustrated.

FIG. 6 comprises first and second microphones ($M_1$, $M_2$) for converting an input sound to first $x_1$ and second $x_2$ electric input signals, respectively. A direction from the target signal to the hearing aid is e.g. defined by the microphone axis and indicated in FIG. 6 by arrow denoted 'Target sound'. The at least one beamformer comprises first and second fixed beamformers ($w^H$) and ($w_{tc}^H$) defined by fixed, e.g. predefined (e.g. frequency dependent), weights $w_1(k)$, $w_2(k)$ and $w_{tc1}(k)$, $w_{tc2}(k)$ for the first and second beamformers ($w^H$) and ($w_{tc}^H$), respectively. The generally complex weights $w_1(k)$, $w_2(k)$ and $w_{tc1}(k)$, $w_{tc2}(k)$ may be determined in advance of using the hearing device, and e.g. stored in memory of the hearing device. The weights may be configured to implement a fixed target maintaining beamformer ($w^H$) and a fixed target cancelling beamformer ($w_{tc}^H$), respectively. The embodiment of FIG. 6 comprises respective analysis filter banks (denoted 'Filter bank' in FIG. 6) for providing the (digitized, time domain) electric input signals in a time-frequency representation (k, n), where k and n are frequency and time indices respectively. The first and second (frequency domain) electric input signals are denoted $x_1(k)$ and $x_2(k)$, where the time index (n) is omitted for simplicity.

The target-maintaining beamformer ($w^H$) and target-cancelling beamformer ($w_{tc}^H$) provide spatially filtered signals a(k) and b(k), respectively, as (different) weighted combinations of the first and second electric input signals $x_1(k)$ and $x_2(k)$, respectively. The first, target-maintaining beamformer ($w^H$) may represent a delay and sum beamformer providing an (enhanced) omni-directional signal (a(k)). The second target-cancelling beamformer ($w_{tc}^H$) may represent a delay and subtract beamformer providing target-cancelling signal (b(k)). The first and second spatially filtered signals provided by the respective fixed beamformers ($w^H$) and ($w_{tc}^H$) are hence given by $$a(k)=w_1(k)\cdot x_1(k)+w_2(k)\cdot x_2(k),$$

$$b(k)=w_{tc1}(k)\cdot x_1(k)+w_{tc2}(k)\cdot x_2(k),$$

In the embodiment of FIG. 6, each of the first and second beamformers ($w^H$) and ($w_{tc}^H$) are implemented in the time-frequency domain by two multiplication units 'x' and a sum unit '+'. The noise reduction system (NRS) comprises the noise canceller (here implemented by further multiplication 'x' and summation units '+') and an adaptive filter for providing the adaptive parameter ($\beta^*(k)$), e.g. as described in connection with FIG. 2 (or implemented in other ways, e.g. by a beamformer, cf. e.g. EP3236672A1). In the embodiment of FIG. 6, the noise reduced (spatially filtered)

target signal (y(k)) is provided as a combination of the first and second spatially filtered signals according to the following expression $$y(k)=a(k)-\beta^*(k)\cdot b(k),$$

where β(k) is the frequency dependent parameter controlling the final shape of the directional beam pattern (of signal y).

The noise reduced (spatially filtered) target signal (y(k)) and the target-cancelling signal (b(k)) are fed to post filter (PF) for further noise reduction and provision of a (resulting) noise reduced signal ($y_{NR}$) of the noise reduction system (NRS).

Figure 7:
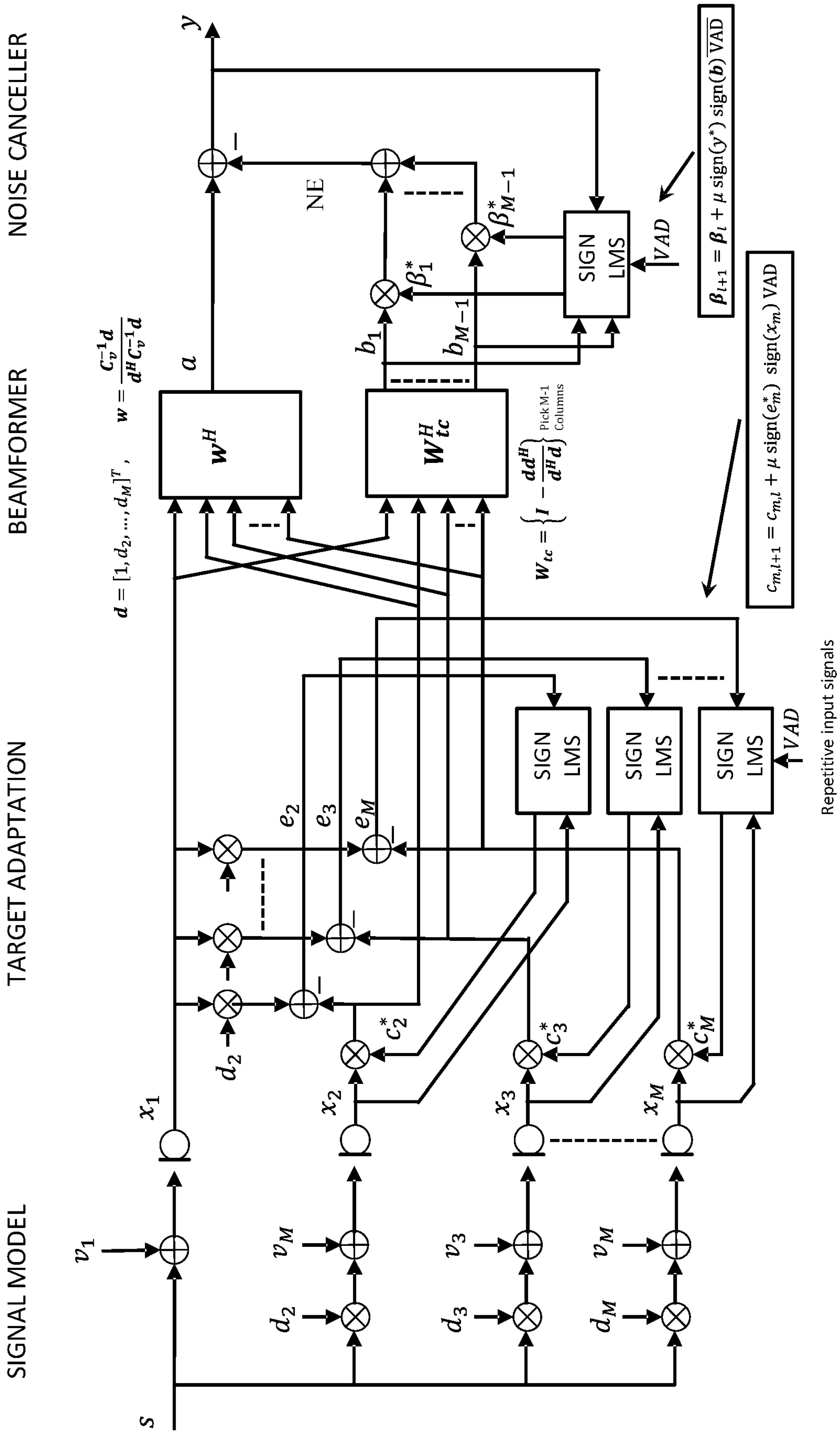
FIG. 7 shows a multi-microphone, noise reduction system comprising respective (time-invariant) target-maintaining and target-cancelling beamformers, and respective noise adaptation and target steering adaptation according to the present disclosure.

FIG. 7 shows a multi-microphone, noise reduction system comprising respective (time-invariant) target-maintaining and target-cancelling beamformers, and respective noise adaptation and target steering adaptation according to the present disclosure.

The embodiment of FIG. 7 (comprising M inputs, e.g. M>three) is a generalization of the embodiment of FIG. 4A (comprising M=two inputs), except that the embodiment of FIG. 7 does not comprise a post filter.

The adaptive noise canceller of FIG. 7 is similar to the adaptive noise canceller of FIG. 4A, except the that target cancelling beamformer of FIG. 7 comprises M−1 outputs $b=[b_1, \ldots, b_{M-1}]$ instead of 1 (b) and the adaptive parameter (β) is a vector (β) comprising M−1 values that are $[\beta_1, \ldots, \beta_{M-1}]$, so that the recursive formula for the $l+1^{th}$ value of β is a vector equation: The adaptive SIGN LMS algorithm may e.g. provide the adaptive parameter according to the following recursive expression:

$$\beta_{l+1}=\beta_l+\mu\ \mathrm{sign}(y^*)\mathrm{sign}(b)\overline{\mathrm{VAD}}$$

where μ is the step size of the adaptive algorithm and $\overline{\mathrm{VAD}}$ denotes 'Not Voice activity' (in other words noise only periods, e.g. provided by a voice activity detector). The parameter $\overline{\mathrm{VAD}}$ may e.g. take on values 1 and 0 for 'Noise only' and 'Not voice only', respectively (or it may assume a probability of the 'Noise only' (e.g. assuming values between 0 and 1). The sign(y*) is the sign of the values of the (further) (complex transposed, y*) of the noise reduced output ($y=a-\beta^H b$) of the output (a) of the time-invariant beamformer ($w^H$). The sign(b) is the sign of the complex value of the output of the time-invariant target-cancelling beamformer ($W_{tc}^H$). The vector b comprises the M−1 b-values, e.g. $b=[b_1, \ldots, b_{M-1}]$, so sign(b)=[sign ($b_1$), . . . , sign ($b_{M-1}$)].

Further, compared to FIG. 4A, the target adaptation module of the generalized embodiment of FIG. 7 comprises M−1 parallel steering vector adaptation branches (each comprising an adaptive complex SIGN LMS algorithm). The generalized steering vector (d) may be written as $d=[1, d_2, d_3, \ldots, d_M]$. Each of the M−1 input branches (apart from the reference input branch) comprises an adaptive complex SIGN LMS algorithm for estimating the input correction coefficient factors $c_m$, m=2, 3, . . . , M, based on the $m^{th}$ input signal $x_m$ and $m^{th}$ error signal $e_m$.

The (fixed) target maintaining beamformer ($w^H$) and a (fixed) target cancelling beamformer ($W_{tc}^H$) of the generalized noise reduction system of FIG. 7 receives M>2 inputs (here M>3), the reference input ($x_l$) and the corrected inputs ($x_2c_2^*, \ldots, x_Mc_M^*$) after application of the (complex conjugated) input correction coefficient factors $c_m$, m=2, 3, . . . , M, to the input signals ($x_2, \ldots, x_M$). The input correction factor ($c_m$) for the $m^{th}$ input signal ($x_m$) are determined as $$c_{m,l+1}=c_{m,l}+\mu\ \mathrm{sign}(e^*_m)\mathrm{sign}(x_m)\mathrm{VAD},\quad \text{for } m=2, \ldots, M,$$

where l is a time index, and m is an input signal (e.g. a microphone) index.

The SIGN LMS algorithms of the embodiment of FIG. 7 repeatedly receives inputs from a voice activity detector (cf. inputs VAD) allowing a discrimination between speech and no speech (e.g. noise) in the current signals (e.g. at a frequency sub-band level).

The generalized expressions for the steering vector d, and the weights of the target maintaining ($w^H$) and the target cancelling ($W_{tc}^H$) beamformers are indicated in FIG. 7.

Figure 8:
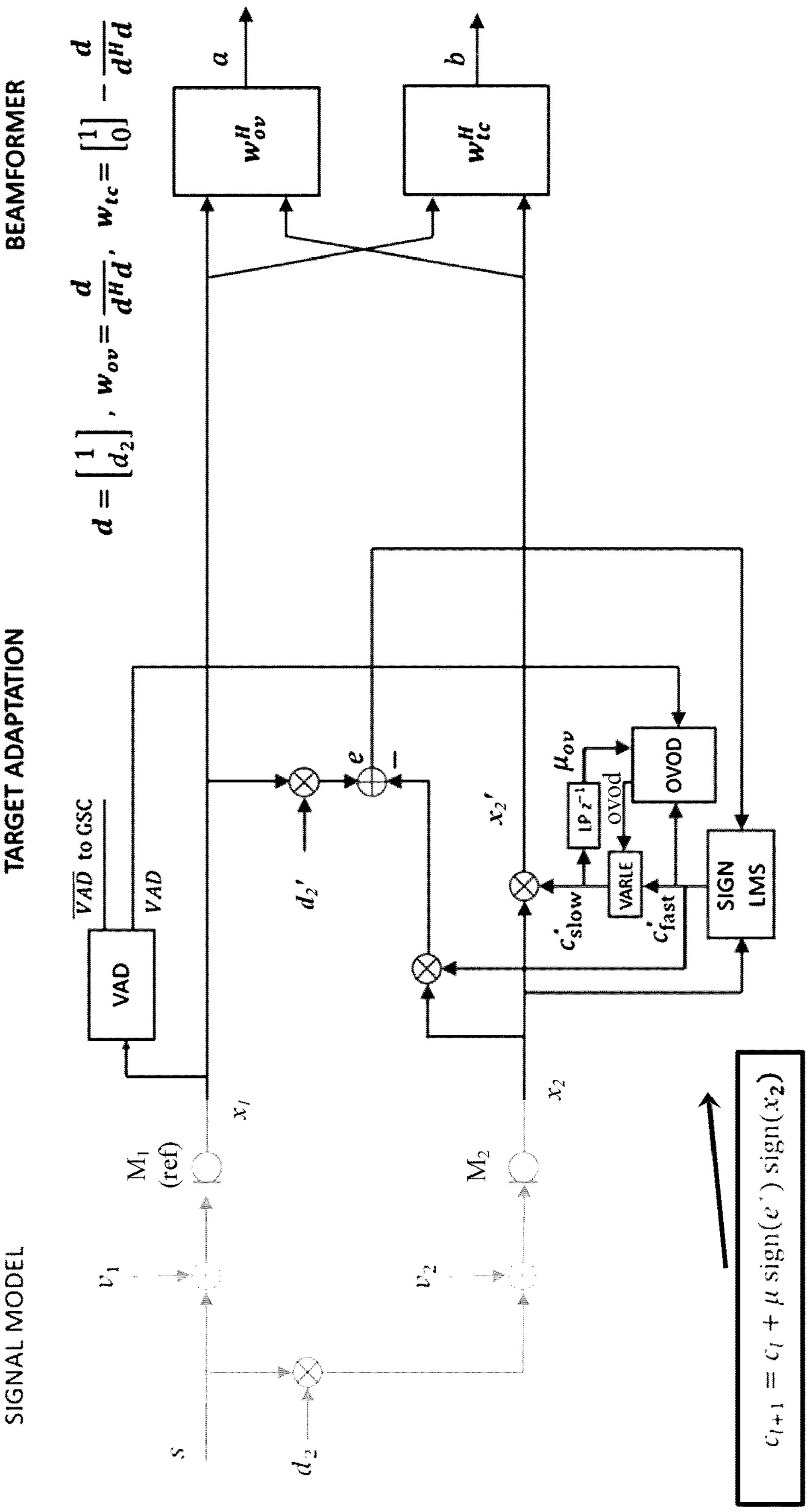
FIG. 8 shows a target signal adaptation of an own voice beamformer according to the present disclosure.

Own Voice-Only Detection/Estimation:

FIG. 8 shows a target steering adaptation of an own voice beamformer according to the present disclosure.

FIG. 8 shows the input and output signals of the own voice-only detector (OVOD) and (own voice and target-cancelling) beamformers ($w_{ov}^H$, $w_{tc}^H$, respectively). The drawing is similar to FIG. 4B (to which is referred), but has further detail (and functionality) regarding the adaptive complex correction factor $c^*_{slow}$ applied to the second microphone signal $x_2$ of the illustrated two-microphone ($M_1$, $M_2$) solution. In the embodiment of FIG. 4B, the complex correction factor (c*) is controlled by a voice activity detector (VAD, cf. input VAD to the SIGN-LMS-block in FIG. 4B), whereas in the embodiment of FIG. 8, the complex correction factor ($c^*_{slow}$) is controlled by an own voice activity detector (cf. input to variable level estimator (VARLE) from the OVOD-block). The latter is further described below. The voice activity detector (VAD) is also indicated to provide a NON-VAD signal (indicating no voice activity in input signal $x_l$), such detector providing a no-voice detection signal being sometimes termed a noise-only detector (NOD)). The NON-VAD signal may be fed to an optional noise reduction part of a General Sidelobe Canceller structure (GSC) (cf. e.g. the expression for the recursively determined adaptive parameter or vector $\beta_{l+1}$ and the input 'VAD' to the SIGN LMS block in FIG. 7).

The own voice-maintaining beamformer ($w_{ov}^H$) represents an enhanced omni beamformer calibrated to own voice (OV) as measured on a model (e.g. a HATS or KEMAR model, or similar, cf. the Head and Torso Simulator (HATS) 4128C from Brüel & Kjær Sound & Vibration Measurement A/S, or the head and torso model KEMAR from GRAS Sound and Vibration A/S), but where model provides the own voice ('the model talks'). The target cancelling beamformer ($w_{tc}^H$) is calibrated to cancel the 'own voice' of the model. Hence, the beamformers ($w_{ov}^H$, $w_{tc}^H$) represent fixed beamformers.

A problem of fixed beamformers is that the hearing device may not be 'correctly' mounted (e.g. different from the (presumably careful) mounting on the model) resulting in the pre-defined (fixed) calibration being non-optimal, and hence effectively resulting in a 'target signal loss'. This again may result in that an adaptive parameter β (cf. e.g. FIG. 3, FIG. 4A, FIG. 6 and section 'Noise Canceller' in FIG. 7) for adaptively cancelling noise around the user is not optimal=>'target reduction'.

In FIG. 8, signal s represents the target input signal (ideally the user's voice), whereas signals $v_m$, m=1, 2, represents noise present at the microphones ($M_1$, $M_2$). The relative acoustic transfer function d2 is the relative acoustic transfer function from the first (reference) microphone ($M_1$ (ref)) to the second microphone ($M_2$) of the true steering vector ($d^T=[1, d_2]$) of the target input signal (own voice), and $d_2'$ is the corresponding calibrated relative acoustic transfer function of the steering vector ($d'^T=[1, d_2']$) from the model (e.g. HATS), where $^T$ indicates transposition.

Based on the second electric input signal ($x_2$) (e.g. from a rear, non-reference microphone ($M_2$) and the error signal (e), the Sign-LMS-algorithm (SIGN LMS) provides a (first) complex correction factor $c^*_{fast}$ that is multiplied onto the rear microphone signal ($x_2$) in a multiplication unit (x). The resulting signal ($x_2 \cdot c^*_{fast}$) is subtracted from the result ($x_1 \cdot d_2'$) of a multiplication of the first electric input signal ($x_1$) from the first (e.g. front, reference) microphone, with the (model) relative acoustic transfer function ($d_2'$) from the first (reference) microphone ($M_1$) to the second microphone ($M_2$) in subtraction unit (+). Thereby the error signal (e) is provided. The error signal (e) is minimized by the Sign-LMS-algorithm, given the current second (rear) microphone signal ($x_2$). The complex correction factor ($c^*_{fast}$) is further fed to a variable level estimator (VARLE) that provides a smoothed complex correction factor ($c^*_{slow}$) that is multiplied onto the rear microphone signal ($x_2$) so that the rear microphone signal ($x_2$) is corrected to fit to the original steering vector ($d_2'$) of the model, see signal ($x_2'$) after multiplication unit (x). The complex 'slow' correction factor $c^*_{slow}$, may e.g. be fed back to own voice detector OVOD via a low-pass filtering function (cf. $LPz^{-1}$-block providing parameter $\mu_{ov}$ to the own voice detector (OVOD), e.g. for recursively updating the average value of the correction factor ($c^*_{fast}$) during own voice-only (cf. below in connection with FIG. 9). The own voice-only detector (OVOD) further receives an input from a conventional (e.g. modulation based) voice activity detector (VAD) to qualify the OV-only-detection, see further below in relation to FIG. 9.

Each user has a unique correction factor (c*) due to different acoustics in the head and torso etc., from person to person. The "average value of the correction factor" ($\mu_{ov}$) may e.g. be initialized individually for each user. The personalized correction factor may e.g. be measured in a (preferably quiet) sound studio where the subject talks while the hearing device(s) are mounted on the person. Instead of a measuring on the particular user, an average correction factor for a given user, may be initialized as the average value of measured personalized correction factors on a multitude of test persons performed in the sound studio.

Compared to the embodiment of FIG. 4B, in an attempt to handle competing speakers, the correction-value (c* in FIG. 4B, $c^*_{slow}$ in FIG. 8), the correction values for the electric input signals are only updated when there is own voice-only. The Sign-LMS algorithm constantly finds the currently dominant sound source (be it speech or noise) and provides a corresponding (first) correction factor $c^*_{fast}$. The correction factor $c^*_{fast}$ is fed to the own voice-only detector (OVOD) for further 'qualification'. The own voice-only detector (OVOD) is configured to identify the time periods wherein the user's own voice is the dominant sound source and to provide an OVOD-signal (own voice-only is present) (ovod) during such time periods. The OVOD-signal is fed to the variable level detector (VARLE) smoothing unit, which provides smoothing of the 'fast' correction factor ($c^*_{fast}$) to provide the 'slow' correction factor ($c^*_{slow}$), but only updates ($c^*_{slow}$) when the OVOD-signal (ovod) is present.

The block diagram of FIG. 8 may e.g. represent a single frequency band k (k=1, . . . , K) of a time-frequency representation (k,n), where k and n are frequency and time-indoces, respectively, or a time-domain implementation.

Figure 9:
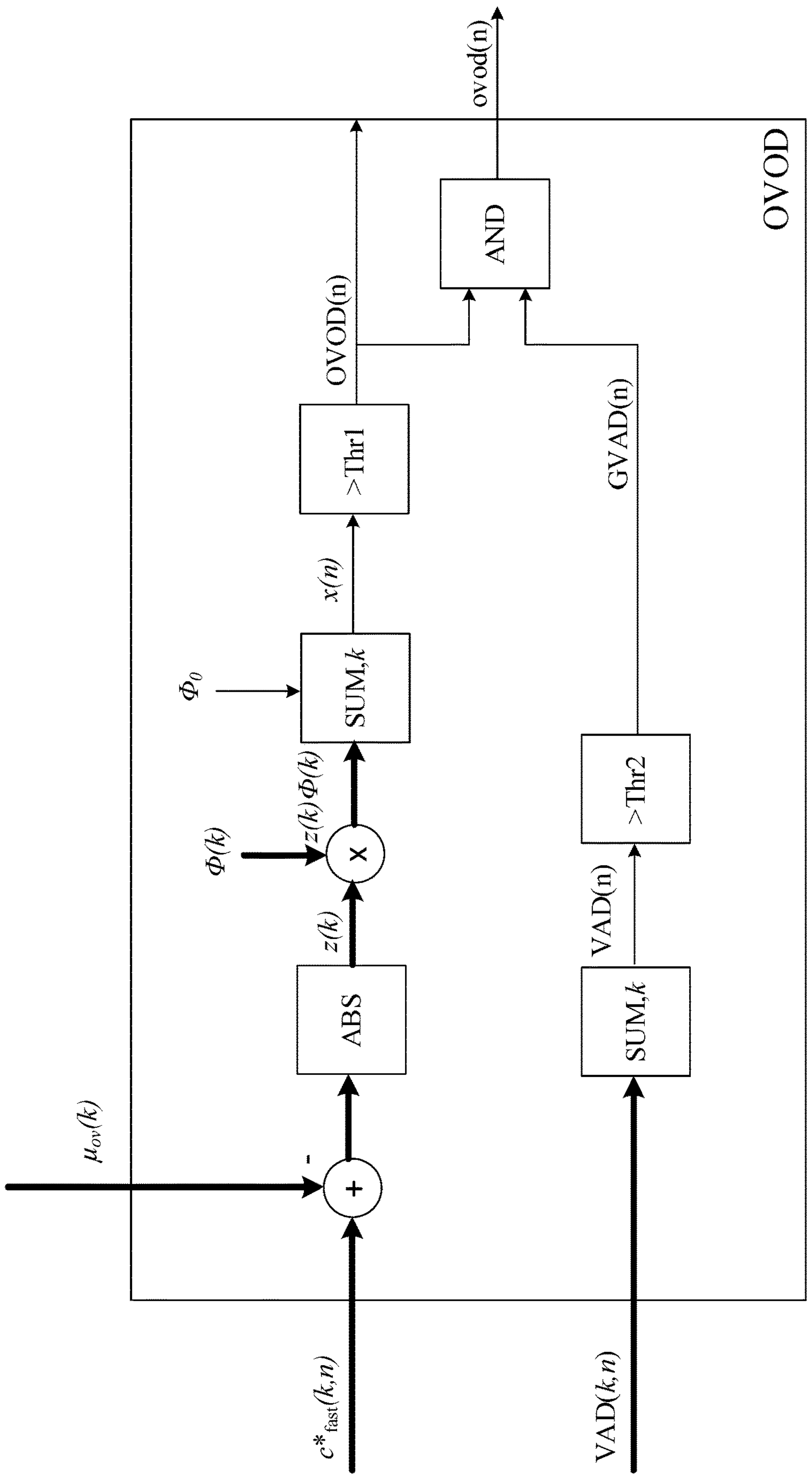
FIG. 9 is an exemplary block diagram of the own voice-only detector (OVOD) of FIG. 8.

FIG. 9 is an exemplary block diagram of the own voice-only detector (OVOD) of FIG. 8.

The main input of the own voice-only detector (OVOD) is the 'fast' correction factor ($c^*_{fast}(k,n)$), which is provided by the Sign LMS algorithm (output of the SIGN LMS block, see FIG. 8). The time variant 'fast' correction factor ($c^*_{fast}$) is provided in a number K of frequency bands. The input $\mu_{ov}(k)$, k=1, . . . , K, is an internal parameter of the own voice-only detector (OVOD) provided in a number (K) of frequency bands (e.g. 24), as indicated by the frequency dependence (k) in FIG. 9. The parameter $\mu_{ov}(k)$ may e.g. be complex or real valued, The parameter may e.g. be initialized as indicated above, e.g. based on average values measured on a multitude of test persons. The internal parameter $\mu_{ov}(k)$ may, however, as indicated in the embodiment of the OVOD of FIG. 8, 9, optionally be updated based on the 'slow' correction factor ($c^*_{slow}$). The parameter may e.g. represent an average value of the 'fast' correction factor ($c^*_{fast}$) (cf. e.g. FIG. 8, where the parameter $\mu_{ov}$ is generated by filtering the fast correction factor ($c^*_{fast}$) through smoothing and/or low-pass filtering functions (cf. VARLE and $LPz^{-1}$-blocks). In the exemplary embodiment of the own voice-only detector (OVOD), the parameter $\mu_{ov}(k)$ is subtracted from the current values of the 'fast' correction factor ($c^*_{fast}(k,n)$ in sum unit ('+') and a magnitude is provided by an ABS-unit providing (a positive) distance measure z(k) (e.g. a difference parameter). If own voice is present, $c^*_{fast}$ will be close to the average value $\mu_{ov}$ and z(k) will hence be relatively small (e.g. close to 0), and oppositely, if own voice is NOT present, $c^*_{fast}$ will be far from the average value $\mu_{ov}$ and z(k) will hence be relatively large. In other words, z(k) is a measure of how far the current values of the 'fast' correction factor ($c^*_{fast}(k,n)$) are from the average $c^*_{fast}$-values ($\mu_{ov}(k)$) (i.e. z(k) provides a measure of the distance (e.g. a difference) between $c^*_{fast}(k,n)$ and $\mu_{ov}(k)$). The distance measure z(k) is multiplied by a frequency dependent parameter ($\Phi(k)$) in multiplication unit ('x') providing the resulting product $z(k)\underline{\Phi}(k)$. The frequency dependent parameter ($\Phi(k)$) may provide a weighting of the distance measure z(k) in dependence of a current acoustic environment. The frequency dependent weighted distance measure z(k) are summed in band sum unit (SUM, k) (or in a synthesis filter bank) providing a resulting time-domain signal x(n). A time domain bias value ($\Phi_0$) is applied to the weighting of the difference parameter z(k) to adjust how aggressive or soft the procedure is, to place x=0 so that it separates own voice (x>0) from other sources (x<0)).

The values of the frequency dependent acoustic environment parameter ($\Phi(k)$) and the average correction factor $\mu(k)$ may e.g. be found by training a neural network with ground truth data for different sound scenes (including own-voice-only scenes) with different noise levels (including estimation of the bias value ($\Phi_0$)).

The resulting time-domain signal x(n) indicating whether or not own voice-only is present is compared to a first threshold value (Thr1, e.g. =0) in '>Thr1' block in FIG. 9, whereby a time dependent own voice-only parameter (OVOD(n)) is provided. An advantage of the own voice-only detector (OVOD) is that the number of false positives is very small Thereby it is ensured that the $c^*_{slow}$ parameters, and hence the rear microphone signal ($x_2'$), are seldomly erroneously updated, cf. FIG. 8.

The lower signal path starting from frequency dependent voice activity signal VAD(k,n) is intended to give more robustness to the own-voice-only detection. As also indicated in FIG. 8, a (e.g. modulation based) per frequency band voice activity detector is used to check whether the source is a modulated source (e.g. speech) and has a 'decent' SNR. The individual band specific VAD-signals are combined (cf. Sum-block (SUM,k) in FIG. 9) and compared to a second threshold value Thr2 (cf. '>Thr'2 block in FIG. 9) to provide a 'Global' (time-domain) VAD-signal (GVAD(n))

that is combined with the own-voice-only detection signal OVOD (cf. AND block in FIG. 9) to provide the resulting time-variant output signal (ovod(n)) of the own voice-only detector (OVOD).

Own voice is typically high level (≥70 dB) because the sound source (mouth) is closer to the microphones of the hearing aid than any other sound source around the user. Such criterion (OV-level≥Lth) may be added as a further input to the AND-block to thereby make the own-voice-only-decision still more robust.

The output of the AND-block is the 'robust' ovod-signal of the OVOD-block, which is used to control to the variable level detector-block (VARLE) in FIG. 8 (and thus the update of the complex correction factor $c^*_{slow}$ for the rear microphone signal ($x_2$') in FIG. 8).

Embodiments of the disclosure may e.g. be useful in applications such as hearing aids or headsets or other wearable audio processing devices with a relatively limited power budget.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

[1] S. Haykin, "Adaptive Filter Theory," 5th edition, Prentice Hall, 2013.
[2] A. Sayed, "Adaptive Filters," IEEE Press, 2008.
[3] M. Clarksson, "Optimal and Adaptive Signal Processing," CRC Press, 1993.
[4] J. Bitzer and K.U.Simmer, "Superdirective Microphone Arrays," in "Microphone Arrays—Signal Processing Techniques," M. Brandstein and D. Wards (Eds.), Springer-Verlag, 2001, Chapter 2.
EP3236672A1 (Oticon) 25 Oct. 2017.

The invention claimed is:

1. A hearing device configured to be worn by a user, the hearing device comprising a multitude of input transducers, each providing an electric input signal representing sound in the environment of the hearing device, thereby providing a corresponding multitude of electric input signals;

a processor for providing a processed signal in dependence of said multitude of electric input signals, the processor comprising at least one beamformer for providing a spatially filtered signal in dependence of said electric input signals, or signals originating therefrom, and beamformer filter coefficients, said beamformer filter coefficients being determined in dependence of a fixed steering vector comprising as elements respective acoustic transfer functions from a target signal source providing a target signal to each of said multitude of input transducers, or acoustic transfer functions from a reference input transducer among said multitude of input transducers to each of the remaining input transducers; and a target adaptation module connected to said multitude of input transducers and to said at least one beamformer, said target adaptation module being configured to provide compensation signal(s) to compensate said multitude of electric input signals so that they match said fixed steering vector, wherein the target adaptation module is configured to minimize an error between a given current electric input signal from a given non-reference input transducer and the electric input signal from the reference input transducer as modified by the steering vector of the at least one beamformer, to thereby compensate said multitude of electric input signals so that they match said fixed steering vector.

2. A hearing device according to claim 1 wherein the target adaptation module comprises at least one adaptive filter for estimating said compensation signal(s).

3. A hearing device according to claim 2 wherein the at least one adaptive filter of the target adaptation module is configured to adaptively determine at least one correction factor to be applied to said electric input signals to provide said compensation signal(s).

4. A hearing device according to claim 2 comprising a voice activity detector for estimating whether or not, or with what probability, an input signal comprises a voice signal at a given point in time, and wherein the at least one adaptive filter is controlled by said voice activity detector.

5. A hearing device according to claim 2 wherein said at least one adaptive filter of the target adaptation module comprises an adaptive algorithm and a variable filter, wherein the adaptive algorithm comprises a step size parameter, and wherein the adaptive algorithm is configured to determine a sign of the step size parameter.

6. A hearing device according to claim 5 wherein the adaptive algorithm of the target adaptation module is a complex sign Least Mean Squares algorithm, and wherein the adaptive algorithm is configured to determine the sign of the step size parameter in dependence of 'the electric input signal' and the error signal.

7. A hearing device according to claim 1 wherein said matching of the fixed steering vector comprises matching a complex-valued steering vector.

8. A hearing device according to claim 7 wherein said matching of the complex steering vector comprises matching the real and imaginary part separately.

9. A hearing device according to claim 7 wherein said matching of the complex steering vector comprises matching a), a1) a magnitude, or a2) a magnitude squared, or b) the phase of the steering vector, or both a) and b).

10. A hearing device according to claim 3 wherein the least one beamformer comprises an own voice beamformer, and wherein the target adaptation module comprises an own voice-only detector configured to determine when said at least one correction factor is updated.

11. A hearing device according to claim 1 wherein the processor is configured to apply one or more processing algorithms to the multitude of electric input signals, or to one or more signals, originating therefrom.

12. A hearing device according to claim 1 wherein said at least one beamformer comprises a time invariant, target-maintaining beamformer and a time invariant, target-cancelling beamformer, respectively.

13. A hearing device according to claim 1 further comprising a noise canceller comprising an adaptive filter for estimating an adaptive noise reduction parameter and providing a noise reduced target signal.

14. A hearing device according to claim 13 wherein the adaptive algorithm of the adaptive filter of the noise canceller comprises the complex sign Least Mean Squares algorithm, and wherein the adaptive algorithm is configured to determine the sign of the step size parameter in dependence of output of the target-cancelling beamformer and the noise reduced target signal.

15. A hearing device according to claim 1 comprising a post filter providing a resulting noise reduced signal exhibiting a further reduction of noise in the target signal in dependence of the spatially filtered signals and optionally one or more further signals.

16. A hearing device according to claim 1 comprising an output transducer for converting said processed signal to stimuli perceivable by the user as sound.

17. A hearing device according to claim 1 being constituted by or comprising a hearing aid.

18. A method of operating a hearing device configured to be worn by a user, the method comprising providing a multitude of electric input signals from a multitude of input transducers, the multitude of electric input signals representing sound in the environment of the hearing device, providing a processed signal in dependence of said multitude of electric input signals, at least by providing, from at least one beamformer, a spatially filtered signal in dependence of said electric input signals, or signals originating therefrom, and beamformer filter coefficients, said beamformer filter coefficients being determined in dependence of a fixed steering vector comprising as elements respective acoustic transfer functions from a target signal source providing a target signal to each of said multitude of input transducers, or acoustic transfer functions from a reference input transducer among said multitude of input transducers to each of the remaining input transducers; and by providing compensation signal(s) to compensate said multitude of electric input signals so that they match said fixed steering vector, by minimizing an error between a given current electric input signal from a given non-reference input transducer and the electric input signal from the reference input transducer as modified by the steering vector of the at least one beamformer, to thereby compensate said multitude of electric input signals so that they match said fixed steering vector.

19. A non-transitory computer readable medium storing a computer program comprising instructions which, when the program is executed by a computer, cause the computer to carry out the method of claim 18.

* * * * *